(12) United States Patent
An et al.

(10) Patent No.: US 11,105,970 B2
(45) Date of Patent: Aug. 31, 2021

(54) OPTICAL MEMBER, DISPLAY DEVICE INCLUDING THE SAME AND METHOD FOR FABRICATING OPTICAL MEMBER

(71) Applicant: Samsung Display Co., Ltd., Yongin-si (KR)

(72) Inventors: Jae Sul An, Hwaseong-si (KR); Jong Hwan Kim, Busan (KR); Seong Yong Hwang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/402,121

(22) Filed: May 2, 2019

(65) Prior Publication Data

US 2019/0391317 A1 Dec. 26, 2019

(30) Foreign Application Priority Data

Jun. 25, 2018 (KR) .................. 10-2018-0072600

(51) Int. Cl.
*F21V 8/00* (2006.01)
*B32B 3/26* (2006.01)
*B32B 7/12* (2006.01)

(52) U.S. Cl.
CPC ............ *G02B 6/0038* (2013.01); *B32B 3/263* (2013.01); *B32B 7/12* (2013.01); *G02B 6/005* (2013.01);
(Continued)

(58) Field of Classification Search
CPC .... G02B 6/0038; G02B 6/005; G02B 6/0061; G02B 6/0065; G02B 6/0036;
(Continued)

(56) References Cited

U.S. PATENT DOCUMENTS

| 5,396,350 A | * | 3/1995 | Beeson ................ G02B 6/0053 349/62 |
| 2007/0081110 A1 | * | 4/2007 | Lee .................... G02F 1/133615 349/61 |

(Continued)

FOREIGN PATENT DOCUMENTS

| CN | 107357083 A | * | 11/2017 | ........... G02B 6/0045 |
| CN | 109031512 A | * | 12/2018 | ....... G02F 1/133615 |

(Continued)

OTHER PUBLICATIONS

EPO Extended Search Report dated Nov. 28, 2019, for corresponding European Patent Application No. 19181681.8, 8 pages.

*Primary Examiner* — Erin Kryukova
(74) *Attorney, Agent, or Firm* — Lewis Roca Rothgerber Christie LLP

(57) ABSTRACT

Provided are an optical member, a display device including the same, and method for fabricating the optical member. The optical sheet includes an adhesive layer; and an optical pattern in contact with a first surface of the adhesive layer; and a release film in contact with a second surface of the adhesive layer, opposite to the first surface, wherein the optical pattern comprises a first pattern extending in a first direction, and a plurality of second patterns formed on the first pattern, wherein the first pattern comprises peak portions having a largest thickness and depressed portions having a smallest thickness, and the adhesive layer comprises a third pattern of recesses respectively aligned with the depressed portions of the first pattern, and a fourth pattern of recesses respectively aligned with the plurality of second patterns.

17 Claims, 27 Drawing Sheets

(52) U.S. Cl.
CPC ........ *G02B 6/0061* (2013.01); *B32B 2551/00* (2013.01)

(58) Field of Classification Search
CPC .... G02B 6/0055; G02B 6/0053; B32B 3/263; B32B 7/12; B32B 2551/00; G02F 1/133615
See application file for complete search history.

(56) References Cited

U.S. PATENT DOCUMENTS

| | | | |
|---|---|---|---|
| 2011/0163066 A1* | 7/2011 | Choi | G02B 6/0036 216/36 |
| 2012/0268687 A1* | 10/2012 | Kaida | B32B 27/08 349/61 |
| 2015/0234110 A1 | 8/2015 | Kim et al. | |
| 2015/0323712 A1 | 11/2015 | Lim et al. | |
| 2017/0139101 A1* | 5/2017 | Lee | G02B 6/0055 |
| 2018/0354225 A1* | 12/2018 | Solomon | G02B 5/0231 |

FOREIGN PATENT DOCUMENTS

| | | | | |
|---|---|---|---|---|
| KR | 100786384 B1 * | 12/2007 | | |
| KR | 10-2011-0039892 A | 4/2011 | | |
| KR | 10-1234931 B1 | 2/2013 | | |
| KR | 20130105215 A * | 9/2013 | | |
| KR | 10-1360218 B1 | 2/2014 | | |
| KR | 10-2014-0039357 A | 4/2014 | | |
| KR | 10-2015-0076552 A | 7/2015 | | |
| KR | 20150085382 A * | 7/2015 | | |
| KR | 10-2016-0044149 A | 4/2016 | | |
| WO | WO-2007020820 A1 * | 2/2007 | ........... | G02B 6/0053 |
| WO | WO-2008082248 A1 * | 7/2008 | ........... | G02B 5/0278 |
| WO | WO-2015156548 A1 * | 10/2015 | ............... | G02B 5/02 |

\* cited by examiner

OPTICAL MEMBER, DISPLAY DEVICE INCLUDING THE SAME AND METHOD FOR FABRICATING OPTICAL MEMBER

CROSS-REFERENCE TO RELATED APPLICATION

This application claims priority to and the benefit of Korean Patent Application No. 10-2018-0072600 filed on Jun. 25, 2018, in the Korean Intellectual Property Office, the entire content of which is incorporated herein by reference.

BACKGROUND

1. Field

One or more aspects of embodiments of the present disclosure are directed toward an optical member, a display device including the same, and a method for fabricating the optical member.

2. Description of the Related Art

Liquid-crystal display devices constitute a large portion of the information display technology. A liquid-crystal display device includes two glass substrates and a liquid-crystal layer sandwiched therebetween. An electrode is formed on each of the glass substrates, and a voltage is applied to align the orientation of the liquid crystals in the liquid-crystal layer to display information by adjusting the light transmittance. Liquid-crystal display devices cannot emit light on their own and thus have to receive light from a backlight assembly to display images. Some backlight assemblies include light sources and a light guide plate. The light guide plate receives light from the light sources and guides the light so that it travels toward the display panel. Typically, point light sources such as LEDs are commonly used as the light sources.

An optical member having a pattern formed thereon may be disposed (e.g., positioned) under the light guide plate to improve the directivity and emission of light emitted from LEDs. However, since such optical member includes a base film, a haze may be generated as the base film deteriorates in a high temperature environment.

SUMMARY

One or more aspects of embodiments of the present disclosure are directed toward an optical member capable of suppressing (or reducing) a haze and improving the efficiency of emission. One or more aspects of the present embodiments are directed toward a display device including an optical member capable of suppressing (or reducing) a haze and improving the uniformity of luminance as well as the efficiency of emission. One or more embodiments are directed toward a method for fabricating an optical member by which a haze can be suppressed (or reduced) and the efficiency of emission can be improved. It should be noted that embodiments of the present disclosure are not limited to the above-mentioned embodiments; and other embodiments of the present invention will become apparent to those skilled in the art from the following description.

According to an example embodiment of the present disclosure, an optical member can improve the uniformity of luminance and the efficiency of emission. According to an example embodiment of the present disclosure, an optical member can guide light and convert wavelengths as an integrated signal element.

It should be noted that effects of the present disclosure are not limited to those described above and other effects of the present disclosure will become apparent to those skilled in the art from the following description.

In an embodiment, an optical member includes a light guide plate; and an optical sheet on a first surface of the light guide plate, wherein the optical sheet comprises an adhesive layer and an optical pattern, a lower surface of the optical pattern being in contact with a first surface of the adhesive layer, wherein the optical pattern comprises a first pattern extending in a first direction, and a plurality of second patterns formed on a surface of the first pattern, wherein the first pattern comprises a base portion and a pattern portion protruding from the base portion, wherein the second patterns have an uneven shape formed on a surface of the first pattern, and wherein the optical pattern is coupled with the first surface of the light guide plate via the adhesive layer.

In an embodiment, an optical sheet includes an adhesive layer; and an optical pattern in contact with a first surface of the adhesive layer; and a release film in contact with a second surface of the adhesive layer, opposite to the first surface, wherein the optical pattern comprises a first pattern extending in a first direction, and a plurality of second patterns formed on the first pattern, wherein the first pattern comprises peak portions having a largest thickness and depressed portions having a smallest thickness, and the adhesive layer comprises a third pattern of recesses respectively aligned with the depressed portions of the first pattern, and a fourth pattern of recesses respectively aligned with the plurality of second patterns.

In an embodiment, a method for fabricating an optical sheet comprises: forming an adhesive layer on an upper surface of a release film; forming a resin layer directly on an upper surface of the adhesive layer; and transferring a surface shape of a stamper by pressing the resin layer with the stamper to form an optical pattern, wherein the optical pattern has a first pattern extending in one direction and a plurality of second patterns formed on the first pattern.

In an embodiment, a method for fabricating an optical sheet comprises: forming a resin layer directly on a surface of a first release film and forming an adhesive layer on a surface of a second release film; pressing the resin layer with a stamper to transfer a surface shape of the stamper and form an optical pattern; peeling off the first release film to expose a lower surface of the optical pattern; and attaching the adhesive layer on the second release film to the lower surface of the optical pattern.

BRIEF DESCRIPTION OF THE DRAWINGS

The above and other aspects and features of the present disclosure will become more apparent from the following description of the example embodiments, with reference to the attached drawings, in which.

DETAILED DESCRIPTION

Figure 1:
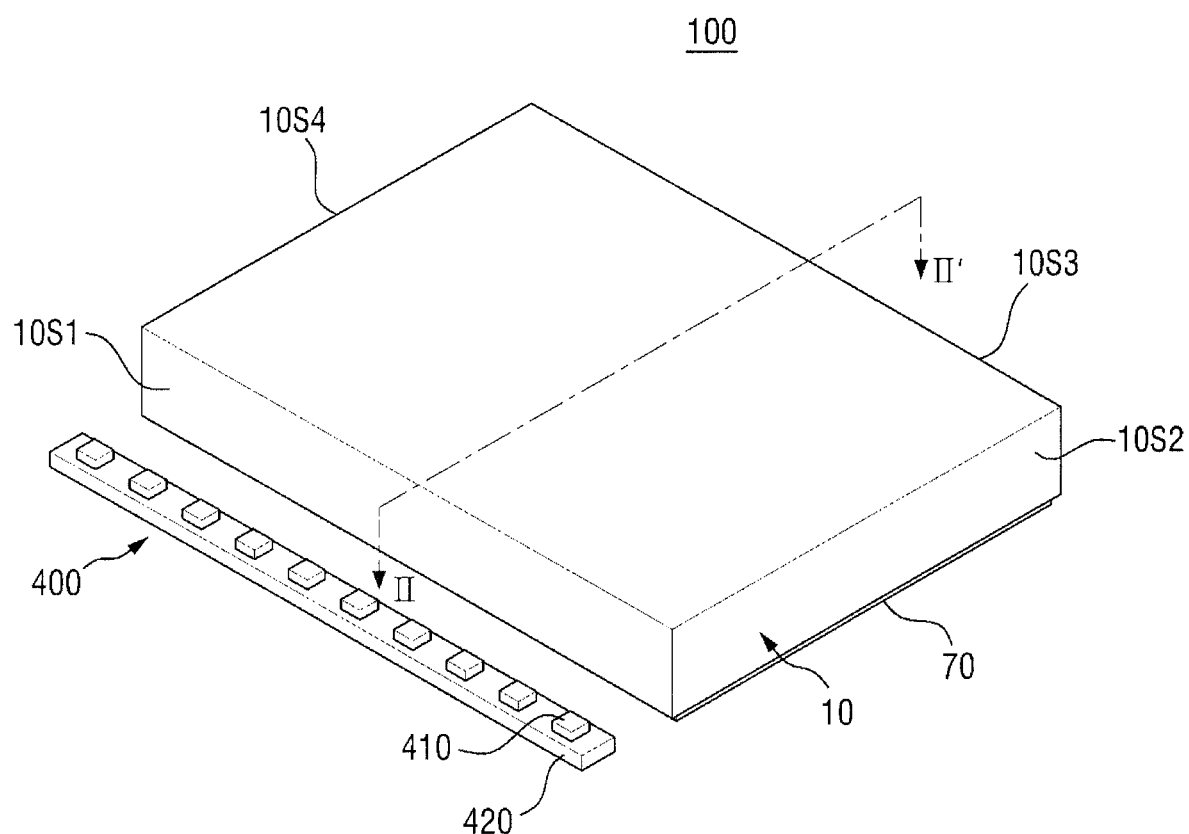
FIG. 1 is a perspective view of an optical member according to an example embodiment of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art, as defined by the appended claims and equivalents thereof. Like reference numerals refer to like elements throughout the specification.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention."

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Figure 2:
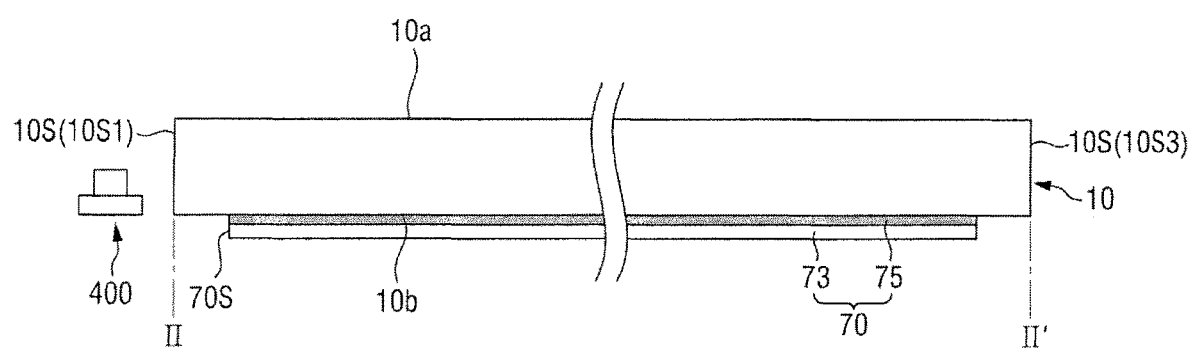
FIG. 2 is a cross-sectional view taken along line II-II' of FIG. 1.

Hereinafter, example embodiments of the present disclosure will be described with reference to the accompanying drawings. FIG. 1 is a perspective view of an optical member according to an example embodiment of the present disclosure. FIG. 2 is a cross-sectional view taken along line II-II' of FIG. 1.

Referring to FIGS. 1 and 2, the optical member 100 includes a light guide plate 10 and an optical sheet 70 disposed (e.g., positioned) on a lower face 10b of the light guide plate 10. The light guide plate 10 and the optical sheet 70 may be integrally combined.

The light guide plate 10 serves to guide the path of light. The light guide plate 10 may have a generally polygonal columnar shape. The shape of the light guide plate 10 may be, but is not limited to being, a rectangle when viewed from the top. In an example embodiment, the light guide plate 10 has a hexahedron shape looking like a rectangle when viewed from the top and may include an upper face 10a, a lower face 10b and four side faces 10s: 10s1, 10s2, 10s3 and 10s4.

In an example embodiment, each of the upper face 10a and the lower face 10b of the light guide plate 10 is positioned in one plane, and the planes in which the upper face 10a is located may be parallel to the plane in which the lower face 10b is located, so that the light guide plate 10 may have a uniform thickness. It is, however, to be understood that the present disclosure is not limited thereto. The upper face 10a or the lower face 10b may be made up of a plurality of planes, or the plane where the upper face 10a is located may intersect with (e.g., cross) the plane where the lower face 10b is located. For example, the light guide plate 10 may have a wedge-shape such that its thickness may be smaller on one side (e.g., the light incidence surface) than on the other side (e.g., the opposite surface) opposed thereto. Further, the lower face 10b may be inclined upward such that the thickness may be reduced in the vicinity of one side (e.g., the light incidence surface) toward the other side (e.g., the opposite surface) opposite thereto, and then the upper face 10a and the lower face 10b may become planar.

In an application of the optical member 100, the light sources 400 may be disposed adjacent to at least one side face 10s of the light guide plate 10. Although in FIG. 1, LED light sources 410 mounted on a printed circuit board 420 are disposed on the side face 10s1 of a longer side of the light guide plate 10, the present disclosure is not limited thereto. For example, the LED light sources 410 may be disposed adjacent to both side faces 10s1 and 10s3 of the longer sides of the light guide plate 10 or may be disposed adjacent to a side face of one of the shorter sides 10s2 and 10s4 of the light guide plate 10 or two side faces of the shorter sides 10s2 and 10s4. In the example embodiment shown in FIG. 1, the side face 10s1 of the longer side of the light guide plate 10 adjacent to which the light sources 400 are disposed serves as the light incidence surface on which light is directly incident. The side face 10s3 of the other longer side, opposite the side face 10s1, serves as an opposite surface.

The light guide plate 10 may be made of a glass material. For example, the light guide plate may be made of, but is not limited to, soda lime glass, borosilicate glass, quartz glass, etc. The light guide plate 10 made of glass has advantages, such as that it has a stronger rigidity than acrylic light guide plate, that it is less deformed against external humidity and temperature changes, and that it can be made thinner. In order to efficiently guide light toward the opposite face 10s3 from the light receiving face 10s1 by the light guide plate 10, it is desired that effective internal total reflection is made on the upper face 10a and the lower face 10b of the light guide plate 10. One of conditions to achieve the internal reflection in the light guide plate 10 is that the refractive index of the light guide plate 10 is larger than the refractive index of the medium that forms the optical interface with it. As the refractive index of the medium that forms the optical interface with the light guide plate 10 is lower, the critical angle for the total reflection becomes smaller, so that more total internal reflection can be better achieved.

For example, the light guide plate 10 may be made of glass having the refractive index of approximately 1.5. When the upper face 10a of the light guide plate is exposed to the air layer to form the interface with it (the refractive index of the air layer is approximately 1), the total reflection can be made sufficiently (or suitably). Another optical function layer may be disposed (e.g., positioned) on the upper face 10a of the light guide plate 10. Then, a low-refractive layer may be further disposed between the optical function layer and the upper face 10a of the light guide plate 10. The optical sheet 70 for improving the efficiency of emission may be disposed on the lower face 10b of the light guide plate 10. The optical sheet 70 may include an optical pattern 73 and an adhesive layer 75 disposed between the optical pattern 73 and the light guide plate 10.

Figure 3:
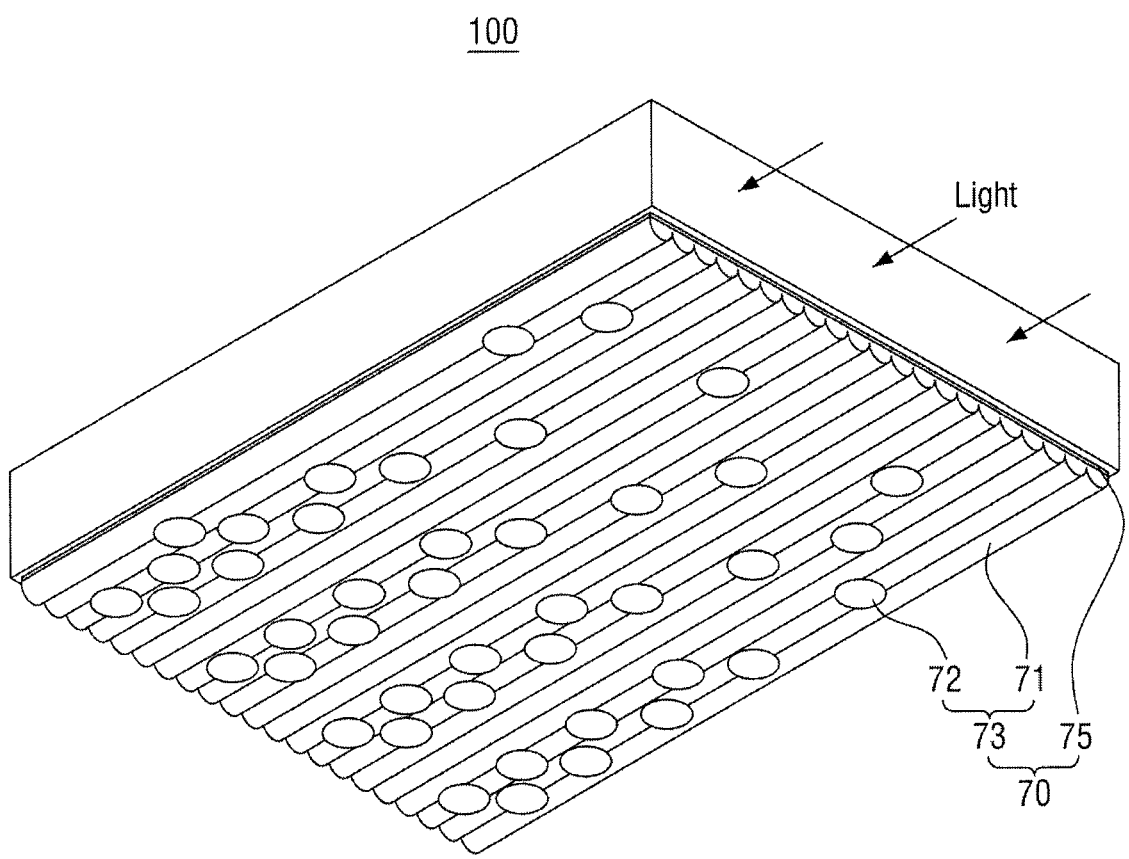
FIG. 3 is a perspective view of a bottom of an optical member according to an example embodiment of the present disclosure.
Figure 4:
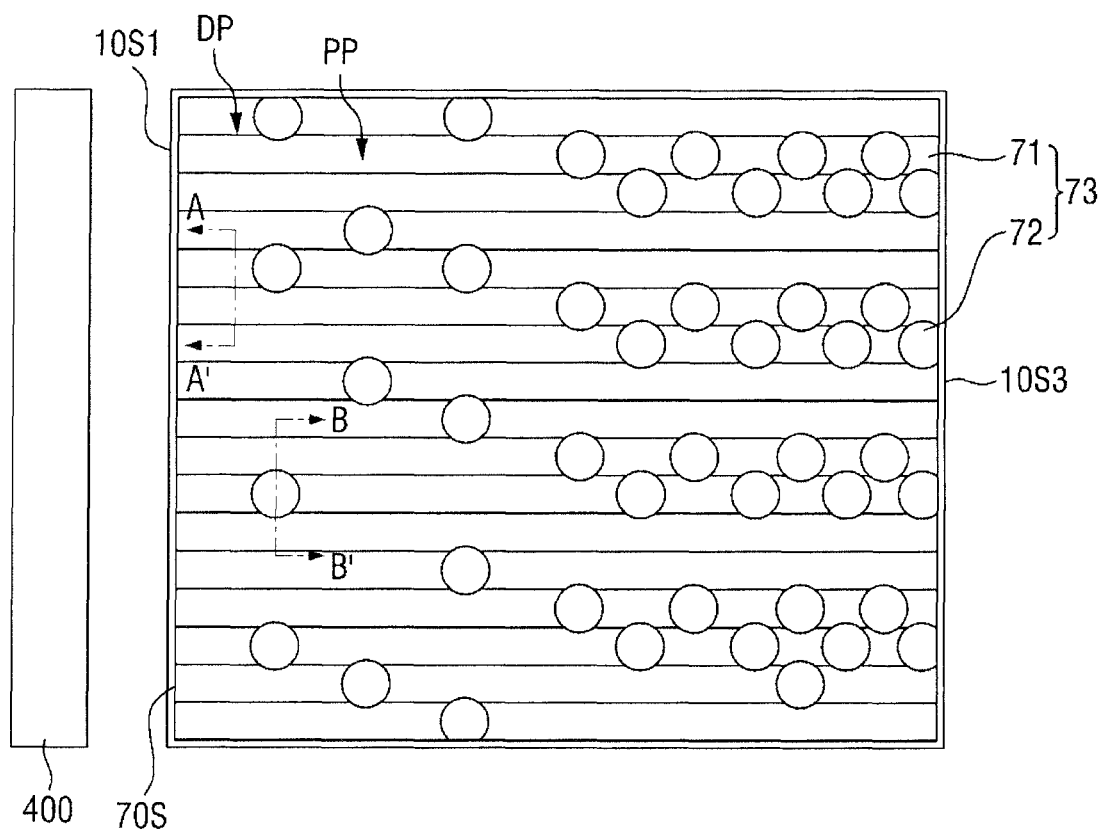
FIG. 4 is a bottom view of the optical member according to the example embodiment of FIG. 3.
Figure 5:
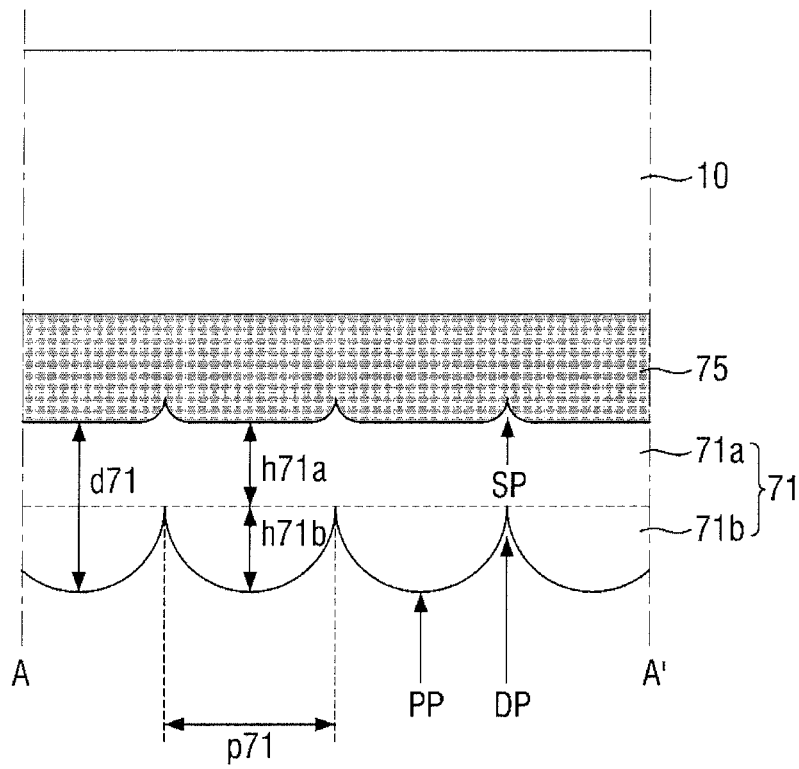
FIG. 5 is a cross-sectional view of the optical member taken along line A-A' of FIG. 4.

FIG. 3 is a perspective view of the bottom of an optical member according to an example embodiment of the present disclosure. FIG. 4 is a bottom view of the optical member according to FIG. 3. FIG. 5 is a cross-sectional view of the optical member taken along line A-A' of FIG. 4. Referring to FIGS. 3 to 5, the optical sheet 70 may be disposed on the lower face 10b of the light guide plate 10. The optical sheet 70 adjusts the path of light to facilitate the light guide plate 10 to uniformly supply light toward the display panel. For example, the optical sheet 70 may cover most of (substantially all or about all of) the lower face 10b of the light guide plate 10, and may expose a part of the edge of the light guide plate 10. For example, one or more of the side faces 10s of the light guide plate 10 may protrude from the side surface 70s of the optical sheet 70. When a certain space is provided between the side surface 70s of the optical sheet 70 and the side face 10s of the light guide plate 10, the optical sheet 70 does not protrude from the light guide plate 10. In addition, when the optical sheet 70 is formed by imprinting, it may be possible to prevent or reduce the possibility of a resin flowing over to the side face 10s of the light guide plate 10 during the process of applying the resin.

In an example embodiment, the optical sheet 70 may be made of, but is not limited to, a material having a refractive index smaller than that of the light guide plate 10. The optical sheet 70 may include an optical pattern 73 and an adhesive layer 75. The optical pattern 73 may include a first pattern 71 that is formed over most of the lower face 10b of the light guide plate 10, and a second pattern 72 that is partially formed on the first pattern 71.

The first pattern 71 may include a convex surface and may be formed in a shape of continuous parallel lines that extend from the light incidence face 10s1 to the opposite face 10s3. This allows the light incident into the light guide plate 10 to travel straight toward the opposite face 10s3. In other words, the first pattern 71 may refract the light traveling toward both side faces 10s2 and 10s4 adjacent to the opposite face 10s3 so that the light travels toward the opposite face 10s3. The second pattern 72 is composed of grooves formed in the first pattern 71 and refracts the light so that it travels toward the display panel 300. That is, the second pattern 72 may refract the light traveling by total reflection within the light guide plate 10 and the optical sheet 70 so that it travels toward the display panel (the upper face 10a of the light guide plate).

The first pattern 71 may include a base portion 71a and a pattern portion 71b. The base portion 71a refers to the portion between the pattern portion 71b and the adhesive layer 75 where no pattern is formed. The base portion 71a serves to support the pattern portion 71b. The pattern portion 71b refers to the portion where the pattern is formed. The path of the light can be adjusted by the pattern portion 71b. For example, the light entering the light incidence face 10s1 may pass through the base portion 71a, and may be refracted/reflected at the interface formed by the pattern portion 71b and the air layer, such that the path of the light is adjusted so that it faces the opposite face 10s3. Some of the light emitted from the light sources 400 may travel toward the opposite face 10s3, and some of the light may travel toward both side faces 10s2 and 10s4 between the opposite face 10s3 and the light incidence face 10s1. Some of the light traveling toward both side faces 10s2 and 10s4 may be refracted at the interface between the pattern portion 71b and the air layer so that the traveling direction of the light may be changed toward the opposite face 10s3.

The pattern portion 71b may be formed along a straight line that extends continuously from the light incidence face 10s1 to the opposite face 10s3 and may have any suitable cross-sectional shape, such as a semicircle, a triangle and/or a square. The cross-sectional shape of the pattern portion 71b may be constant along the extended straight line, but the present disclosure is not limited thereto. For example, as shown in FIG. 5, the pattern portion 71b may have a lenticular shape. Its cross-section may have a semi-circular shape with a constant size from the light incidence face 10s1 to the opposite face 10s3. Although not shown in the drawings, the cross-sectional shape of the pattern portion 71b may have circles (or semi-circles) that become larger from the light incidence face 10s1 to the opposite face 10s3.

The thickness d71 of the first pattern 71 may be defined as the sum of the height h71a of the base portion 71a and the height h71b of the pattern portion 71b. The base portion 71a may have the same height h71a throughout the first pattern 71 whereas the pattern portion 71b may have the height h71b which may vary depending on the shape of the pattern. Therefore, the change in the thickness d71 of the first pattern 71 depends on the change in the height h71b of the pattern portion 71b.

For example, if the first pattern 71 is a lenticular pattern, the first pattern 71 may have the largest thickness d71 at the peak portion PP (that corresponds to the highest portion of the pattern portion 71b) and the smallest thickness d71 at the depressed portion DP (that corresponds to the thinnest portion of the first pattern 71). In some embodiments, the height h71b of the pattern portion 71b may be, but is not limited to being, equal to the height h71a of the base portion 71a. In some embodiments, the height h71b of the pattern portion 71b may be different from the height h71a of the base portion 71a.

The height h71b of the pattern portion 71b may be determined based on the pitch p71 of the pattern portion 71b. For example, as the ratio of the height h71b to the pitch p71 of the pattern portion 71b is increased (e.g., as h71b/p71 is increased), the pattern portion 71b protrudes more from the base portion 71a, and the straightness of the light increases. However, it may be impractical to significantly increase the height h71b of the pattern portion 71b, because it increases the thickness d71 of the first pattern 71.

The pitch p71 of the pattern portion 71b may be determined based on the height h71b of the pattern portion 71b. If the ratio of the pitch p71 to the height h71b of the pattern portion 71b is too large (e.g., if p71/h71b is too large), the surface area of the pattern portion 71b becomes small, such that the light is less likely to be refracted at the surface of the pattern portion 71b. On the other hand, if the ratio of the pitch p71 to the height h71b of the pattern portion 71b is too small, it may not be possible to achieve a sufficient durability to support the pattern portion 71b protruding from the base portion 71a. In view of the above, the pitch p71 of the pattern portion 71b may range from 20 μm to 200 μm. That is, when the pitch p71 of the pattern portion 71b is 200 μm or less, the first pattern 71 can effectively (or suitably) guide the straightness of light within the range of height h71b of the pattern portion 71b. If the pitch p71 of the pattern portion 71b is equal to or greater than 20 μm, it is possible to achieve the suitable durability for maintaining the shape of the pattern portion 71b within the range of the height h71b of the pattern portion 71b mentioned above.

When the first pattern 71 is formed by imprinting, a resin forming the first pattern 71, may be peeled off during a process of separating a stamper from the resin due to the attraction force between the resin and the stamper. However, if the pitch p71 of the pattern portion 71b is 20 μm or more, a sufficient attractive force of the resin can be obtained such that the resin is not torn off by the stamper. In an example embodiment, the ratio of the height h71b of the pattern portion 71b to the pitch p71 of the pattern portion 71b (h71b/p71) may range from 0.02 to 0.5. The base portion 71a and the pattern portion 71b of the optical pattern 73 may be integrally formed as a single resin.

The adhesive layer 75 may be disposed between the first pattern 71 and the lower face 10b of the light guide plate 10 to attach and fix the first pattern 71 to the lower face 10b of the light guide plate 10.

The adhesive layer 75 may include a third pattern SP comprised of portions that are recessed toward the light guide plate 10. That is, the adhesive layer 75 may include a lower surface that comes in contact with the first pattern 71 and an upper surface that comes in contact with the light guide plate 10, and a third pattern SP that is depressed toward the upper surface direction from the lower surface of the adhesive layer 75 may be formed.

The adhesive layer 75 may be made of a pressure sensitive adhesive (PSA) and the third pattern SP of the adhesive layer 75 may be formed during the process of imprinting, in which the first pattern 71 is directly formed on one side of the adhesive layer 75 as the pressure of the stamper is transferred to the adhesive layer 75. For example, the depressed portions of the third pattern SP may be formed to align with the depressed portions DP of the first pattern 71, where the pressure of the stamper is concentrated during the imprinting process.

In some embodiments, the third pattern SP may be formed in a shape recessed toward the upper surface of the adhesive layer 75 from the lower surface of the adhesive layer 75 in line (e.g., in alignment) with the depressed portions DP of the first pattern 71. For example, the third pattern SP may be formed with recesses in line with the depressed portions DP of the first pattern 71, respectively. The depth of the recesses of the third pattern SP may be smaller than the depth of the depressed portions DP. Here, "depth" refers to a direction from the surface of the adhesive layer 75 that is in contact with the first pattern 71 (or from the lenticular surface of the first pattern 71) towards the light guide plate 10. It is, however, to be understood that the present disclosure is not limited thereto.

In some embodiments, the depth of the third pattern SP may be equal to or greater than the depth of the depressed portion DP, depending on the material of the optical pattern 73 and the material of the adhesive layer 75.

The third pattern SP formed in the adhesive layer 75 may be formed in a depressed shape corresponding to only some of the depressed portions DP of the first pattern 71. In some embodiments, the third pattern SP may not be formed, depending on the shape of the optical pattern 73, the thickness of the resin layer, and the degree of the pressure, etc. The adhesion area between the optical pattern 73 and the adhesive layer 75 is increased by the third pattern SP formed in the adhesive layer 75 so that the adhesive layer 75 and the optical pattern 73 can be more firmly fixed.

The adhesive layer 75 may be made up of a plurality of layers. For example, a primer layer may be further included for enhancing adhesion, but the present disclosure is not limited thereto.

The refractive index of the adhesive layer 75 may be smaller than the refractive index of the light guide plate 10, and the difference between the refractive index of the adhesive layer 75 and the refractive index of the light guide plate 10 may be, but is not limited to, 0.1 or less.

The refractive index of the optical pattern 73 may be smaller than the refractive index of the adhesive layer 75, and the difference between the refractive index of the optical pattern 73 and the refractive index of the adhesive layer 75 may be, but is not limited to, 0.1 or less. As such, the refractive index of the adhesive layer 75 and the refractive index of the optical pattern 73, which form the optical interface with the light guide plate 10, are set to be smaller than the refractive index of the light guide plate 10, so that more total internal reflection can be induced (e.g., achieved).

Figure 6:
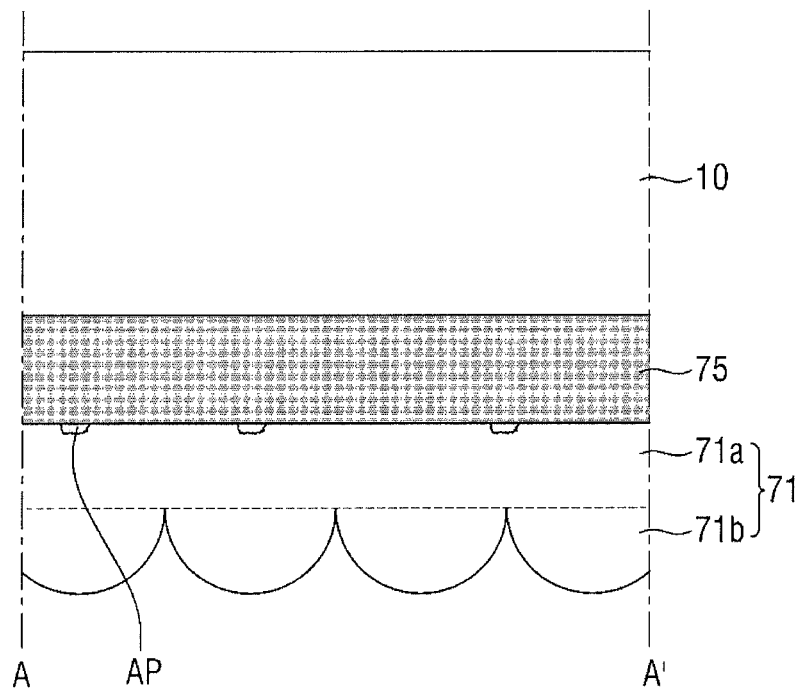
FIG. 6 is a cross-sectional view of an optical member according to another example embodiment of the present disclosure, taken along line A-A' of FIG. 4.
Figure 7:
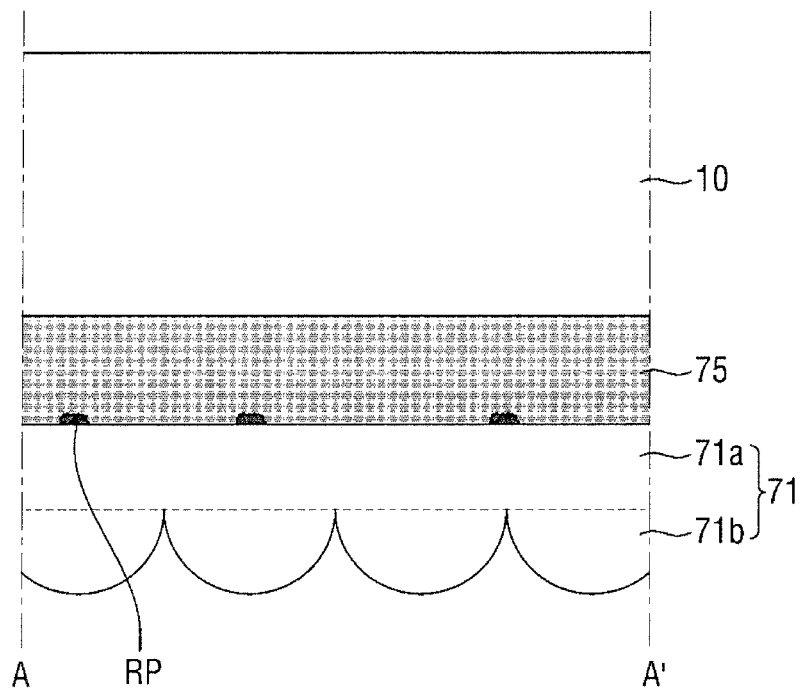
FIG. 7 is a cross-sectional view of an optical member according to another example embodiment of the present disclosure, taken along line A-A' of FIG. 4.

FIG. 6 is a cross-sectional view of an optical member according to another example embodiment of the present disclosure, taken along line A-A' of FIG. 4. FIG. 7 is across-sectional view of an optical member according to another example embodiment of the present disclosure, taken along line A-A' of FIG. 4.

Referring to FIG. 6, air pockets AP may be formed at the interface between the adhesive layer 75 and the first pattern 71 of the optical member according to this example embodiment of the present disclosure. That is, a base portion 71a of the first pattern 71 in contact with the adhesive layer 75 may include depressed portions formed in the direction of the first pattern 71 (away from the adhesive layer 75), and air pockets AP may be formed at the interface between the adhesive layer 75 and the first pattern 71 in the depressed portions formed in the base portion 71a.

The depressed portions of the base portion 71a may be formed as a part of the base portion 71a of the first pattern 71 is torn off (e.g., torn) during the process of directly forming the first pattern 71 on a first release film and peeling off the first pattern 71 from the first release film. By attaching the adhesive layer 75 formed on a second release film to the base portion 71a of the first pattern 71, the depressed portions are adjacent to the upper surface of the adhesive layer 75, so that the air pockets may be formed in the depressed portions at the interface between the adhesive layer 75 and the first pattern 71. The second release film is removed after the adhesive layer 75 is attached to the first pattern 71.

The air pockets AP formed at the interface between the adhesive layer 75 and the first pattern 71 will be described in more detail below together with the description of a method for fabricating an optical member 100.

Referring to FIG. 7, a foreign matter pattern made of a material different from that of the adhesive layer 75 and that of the optical pattern 73 may be disposed at the interface between the adhesive layer 75 and the first pattern 71 according to another example embodiment of the present disclosure. For example, the foreign matter pattern may be, but is not limited to, residues of the first release film.

An embodiment in which the foreign matter pattern is comprised of residues of the first release film will be described in more detail below. The residues RP of the first release film located on the interface between the adhesive layer 75 and the first pattern 71 may be formed as a part of the first release film is peeled off together in the base portion 71a of the first pattern 71 during the process of forming the first pattern 71 directly on the first release film and peeling off the first pattern 71 from the first release film.

When the adhesive layer 75 formed on the second release film is then attached to the base portion 71a of the first pattern 71, the residues RP of the first release film may be located on the interface between the adhesive layer 75 and the first pattern 71. The second release film is removed after the adhesive layer 75 is attached to the first pattern 71. The residue RP of the first release film on the interface between the adhesive layer 75 and the first pattern 71 will be described in more detail below together with the description of a method for fabricating an optical member 100.

Figure 8:
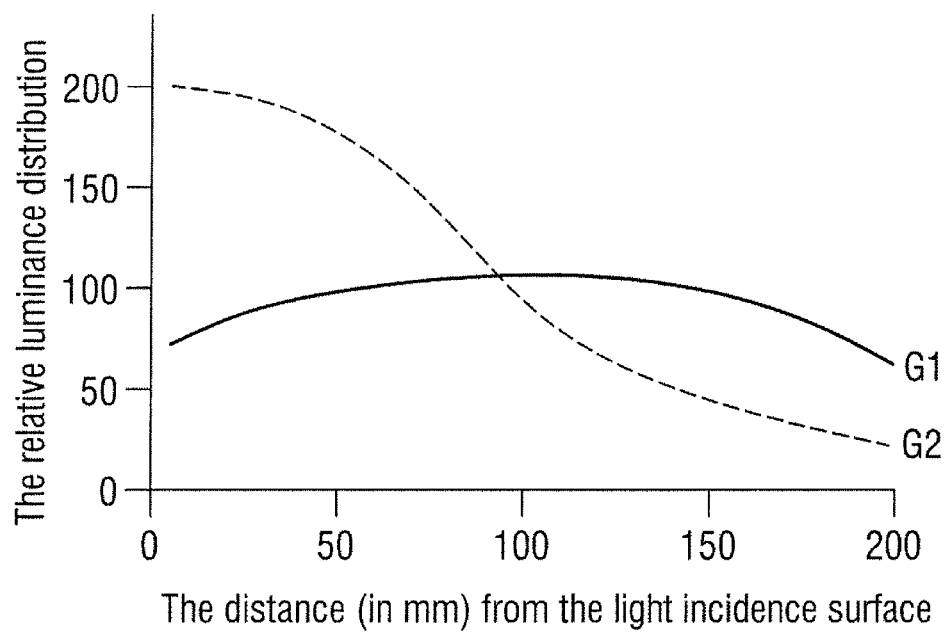
FIG. 8 is a graph illustrating the change of the luminance distribution over time.

FIG. 8 is a graph for illustrating the change of the luminance distribution over time of comparable optical members in which the optical sheet comprises a base film. The horizontal axis represents the distance (in mm) from the light incidence surface to the opposite surface, and the vertical axis represents the relative luminance distribution from the light incidence surface to the opposite surface of the light guide plate.

Referring to FIG. 8, a curve G1 shows a substantially uniform luminance distribution from the light incidence face 10s1 to the opposite face 10s3 (see e.g., FIG. 2), indicating substantially no change in the base film over time. On the other hand, a curve G2 shows high luminance at the light incidence face 10s1 and a rapid drop in luminance toward the opposite face 10s3, indicating a change in the base film over time.

The change in the base film over time may refer to the base film being deformed after it is formed. The base film may be made of an acrylic film, a polyether film, a polyester film, a polyolefin film, a polyamide film, a polyurethane film, a polycarbonate film and/or a polyimide film, in consideration of mechanical strength. The base film may undergo a change over time when it is exposed to a high temperature environment.

For example, when the optical sheet of a comparable optical member includes the base film, a change in the base film over time may result from a high-temperature environment, thereby lowering the luminance uniformity of light exiting through the optical sheet.

However, in the present embodiments, when the first pattern 71 (see e.g., FIG. 5) is formed directly on one surface of the adhesive layer 75 (see e.g., FIG. 5), or when the first pattern 71 (see e.g., FIGS. 6 and 7) is formed directly on the first release film and then the adhesive layer 75 (see e.g., FIGS. 6 and 7) formed on the second release film is attached to the first pattern 71, a base film between the adhesive layer 75 and the first pattern 71 can be eliminated (or omitted), such that the manufacturing process can be simplified, the fabricating cost can be saved (or reduced), and the luminance uniformity can be maintained in a high temperature environment.

Referring back to FIGS. 3 to 5, the second pattern 72 may have a concave-convex shape formed on the surface of the first pattern 71. For example, the second pattern 72 may be comprised of concave shapes recessed from the surface of the first pattern 71. It is, however, to be understood that the present disclosure is not limited thereto.

The second pattern may be a pattern of convex shapes or may be a pattern of convex shapes and concave shapes. The second pattern may be, but is not limited to, a pattern of circles when viewed from the top. The second pattern 72 may refract light to guide the light toward the display panel. That is, the light traveling by total reflection in the light guide plate 10 and the optical sheet 70 may have an incidence angle smaller than a critical angle at the optical interface formed by the second pattern 72 and the air layer, such that the path of the light may be changed toward the display panel.

The density of the second pattern 72 may vary in a longitudinal direction (that extends from the light incidence face 10s1 toward the opposite face 10s3) of the first pattern 71. For example, the second pattern may have a lower density adjacent to (or near) the light incidence face 10s1, where a larger amount of light is induced, and a higher density adjacent to (or near) the opposite face 10s3, where a smaller amount of light is induced.

In some embodiments, the second pattern 72 may have a smaller area closer to the light incidence face 10s1 and may have a larger area closer to the opposite face 10s3.

The second pattern 72 may have a regular (e.g., uniform) pattern in a width direction of the first pattern 71 (that extends from the side face 10s2 toward the side face 10s4), the width direction crossing the longitudinal direction, or may have an irregular pattern. For example, in order to uniformly supply light to the display panel, it may be advantageous for the second pattern to have similar (or substantially the same) density in the width direction.

The second pattern 72 may be disposed not only in the peak portions PP but also in the depressed portions DP of the first pattern 71, and may be disposed across the peak portions PP and the depressed portions DP. In an example embodiment, the shapes of the second pattern 72 may be staggered along the width direction of the first pattern 71.

For example, if the longitudinal direction of the first pattern 71 is referred to as a "row" and the width direction of the first pattern 71 is referred to as a "column," the portions of the second pattern 72 arranged in the same column may not be arranged in the adjacent rows. In other words, the portions of the second pattern 72 arranged in the same column may be arranged only in the odd-numbered rows but not in the even-numbered rows.

Figure 9:
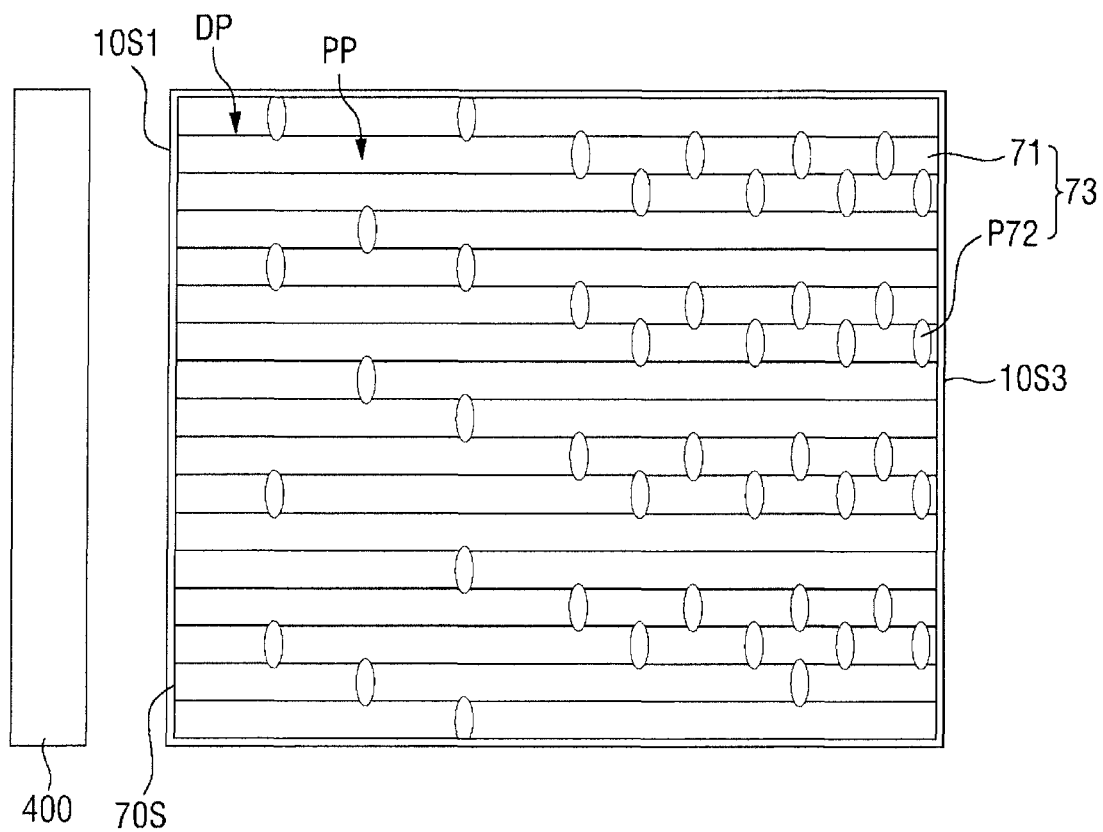
FIGS. 9 and 10 are views for illustrating second patterns according to example embodiments of the present disclosure.
Figure 10:
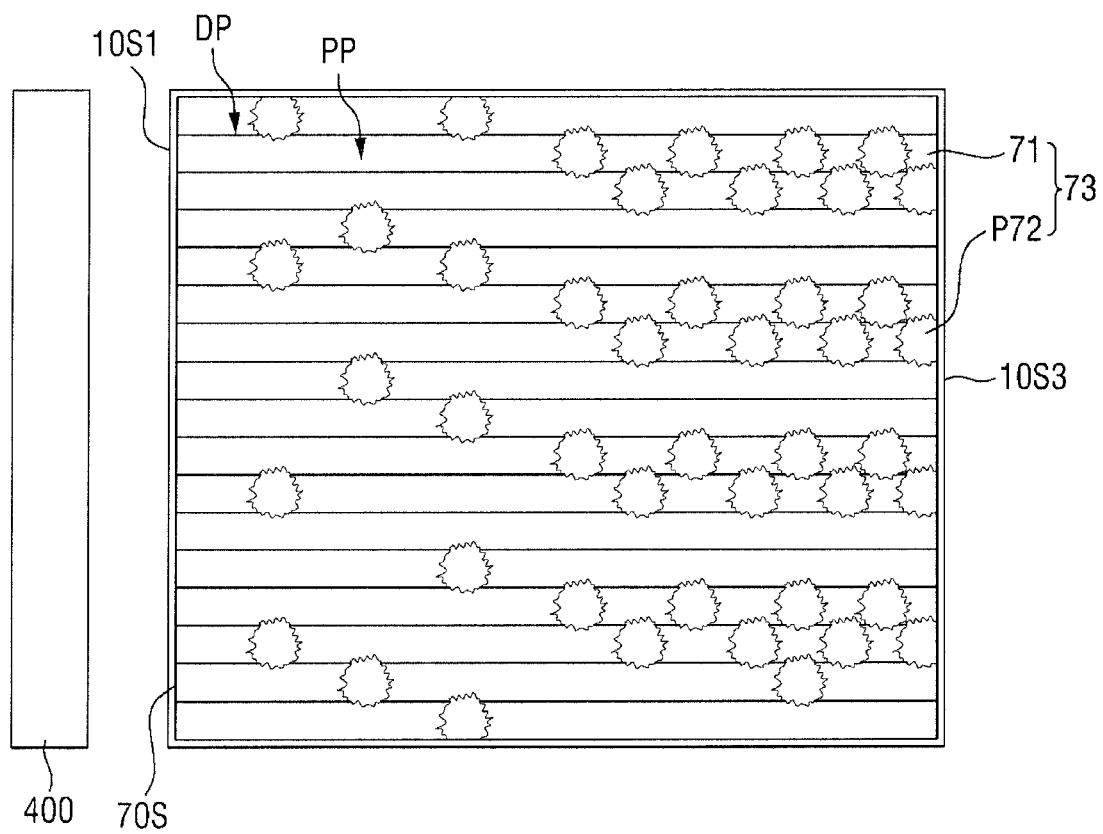

FIGS. 9 and 10 are views for illustrating second patterns according to other example embodiments of the present disclosure. Referring to FIGS. 9 and 10, the second pattern 72 may be a pattern of ellipses or a pattern of irregular shapes when viewed from the top. It is, however, to be understood that the present disclosure is not limited thereto. The second pattern 72 may be a pattern of polygonal shapes, a pattern of semicircular shapes, and/or the like. When the second pattern 72 is a pattern of elliptical shapes or irregular shapes, for example, the pitch p72 corresponding to the diameter of an elliptical shape of the second pattern 72 may be set as the maximum length in each of the shapes.

Figure 11:
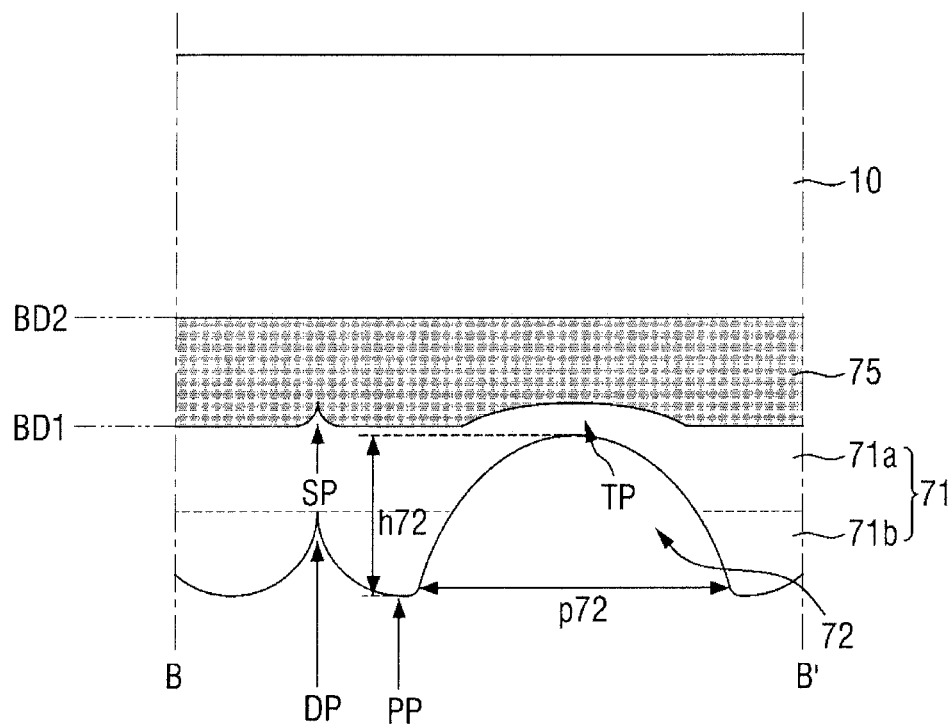
FIG. 11 is a cross-sectional view taken along line B-B' of FIG. 4.

FIG. 11 is a cross-sectional view taken along line B-B' of FIG. 4. Referring to FIG. 11, the second pattern 72 may have a pattern of grooves recessed from the surface of the first pattern 71.

In some embodiments, the height h72 of the second pattern 72 may be 20 μm or less, and may preferably be 10 μm or less taking into account the luminous efficiency, but the present disclosure is not limited thereto.

The pitch p72 of the second pattern 72 may be determined by taking into account the pitch p71 of the pattern portion 71b. For example, the pitch p72 of the second pattern 72 may be equal to or larger than half the pitch p71 of the pattern portion 71b, taking into account the efficiency of emission. It is, however, to be understood that this is merely illustrative.

The adhesive layer 75 may include a fourth pattern TP which is recessed toward the light guide plate 10. That is, the fourth pattern TP depressed toward the light guide plate 10 may be formed on the lower surface of the adhesive layer 75, and may be in line (e.g., aligned) with the second pattern 72. The depth of the fourth pattern TP may be smaller than the depth of the second pattern 72. It is, however, to be understood that the present disclosure is not limited thereto.

In some embodiments, the depth of the fourth pattern TP may be equal to or greater than the depth of the second pattern 72, depending on the material of the optical pattern 73 and the material of the adhesive layer 75. Since the second pattern 72 is formed deeper than the depressed portion DP, the fourth pattern TP formed in line with the second pattern 72 may be formed deeper than the third pattern SP. It is, however, to be understood that the present disclosure is not limited thereto. The depth of the third pattern SP may be greater than or equal to the depth of the fourth pattern TP, depending on the area difference between the second pattern 72 and the depressed portion DP.

The depressed shapes (or portions) of the fourth pattern TP formed in the adhesive layer 75 may be in line with only some of the shapes (or portions) of the second pattern 72. In some embodiments, the fourth pattern TP may not be formed, depending on the shape of the optical pattern 73, the thickness of the resin layer, and the degree of the pressure, etc. The adhesion area between the optical pattern 71 and the adhesive layer 75 is increased by the third pattern SP formed in the adhesive layer 75 so that the adhesive layer 75 and the optical pattern 71 can be more firmly fixed. The depressed shapes of the fourth pattern TP may be in line with the shapes of the second pattern 72, respectively, or may be in line with only some of them.

The adhesive layer 75 may be made of a pressure sensitive adhesive (PSA) and the fourth pattern TP of the adhesive layer 75 may be formed during the process of imprinting, in which the second pattern 72 is directly formed on one surface of the adhesive layer 75 as the pressure of the stamper is transferred to the adhesive layer 75. That is, the depressed shapes of the fourth pattern TP may be in line with the shapes of the second pattern 72 where the pressure of the stamper is concentrated during the imprinting process. A bonding force BD1 between the adhesive layer 75 and the base portion 71a may be larger than a bonding force BD2 between the adhesive layer 75 and the light guide plate 10. The bonding force BD2 between the adhesive layer 75 and the light guide plate 10 may be 1N/25 mm or more. It is, however, to be understood that this is merely illustrative.

Figure 12:
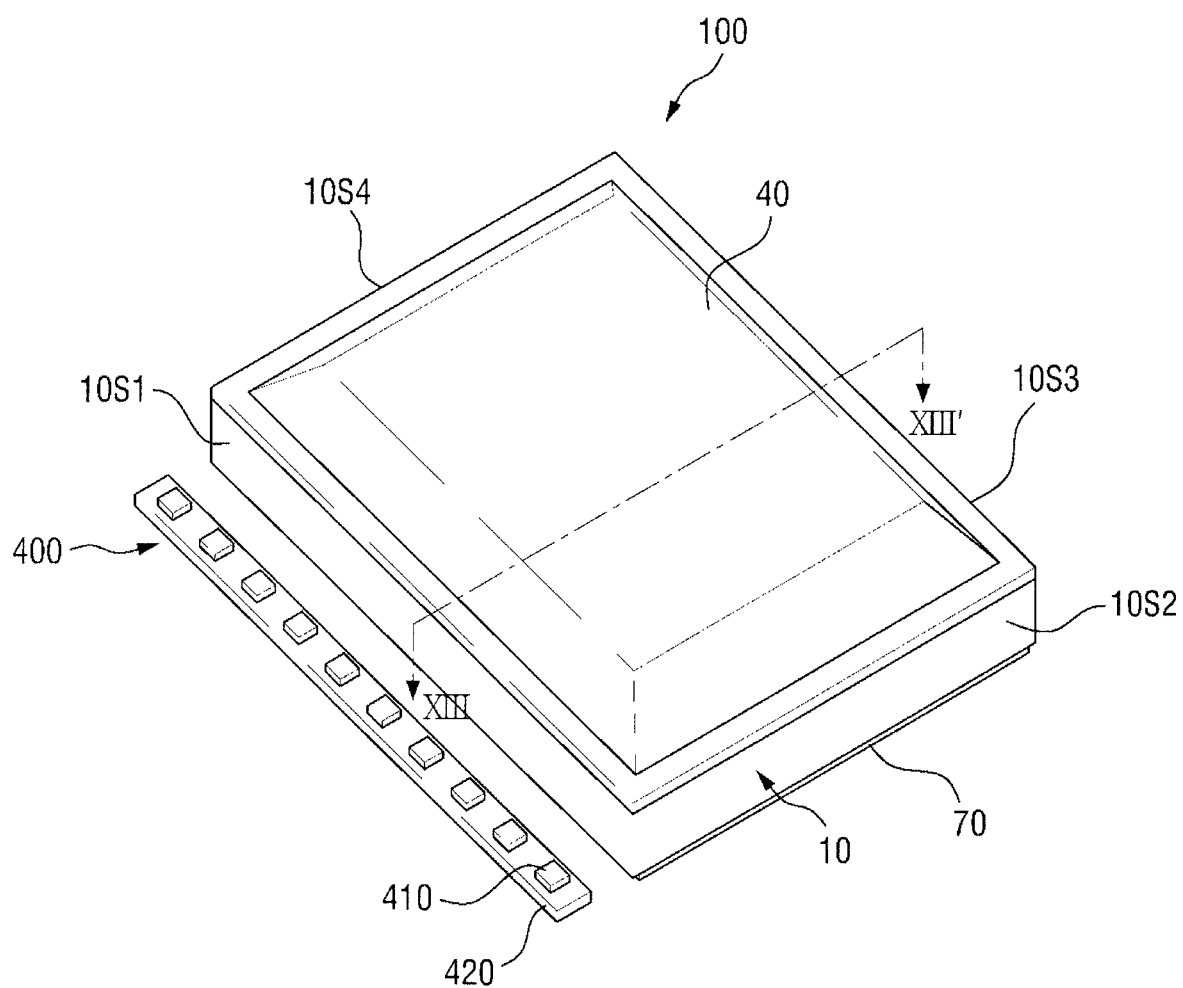
FIG. 12 is a perspective view of an optical member according to another example embodiment of the present disclosure.
Figure 13:
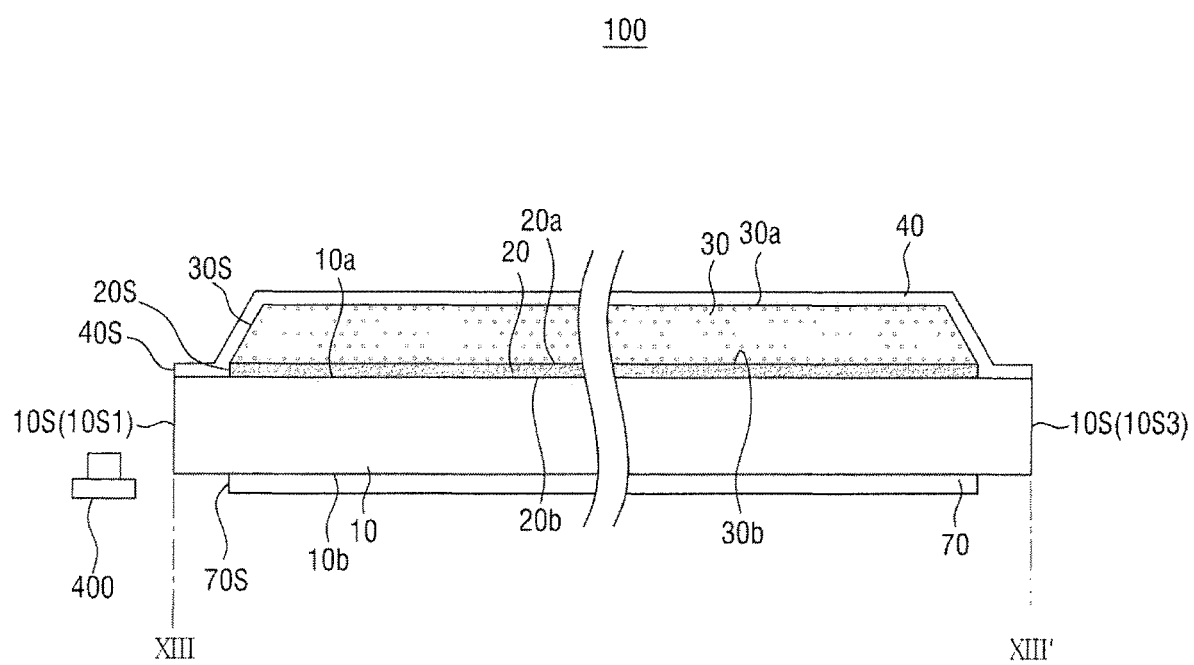
FIG. 13 is a cross-sectional view taken along line XIII-XIII' of FIG. 12.

FIG. 12 is a perspective view of an optical member according to yet another example embodiment of the present disclosure. FIG. 13 is a cross-sectional view taken along line XIII-XIII' of FIG. 12. In the following description, the same or similar elements will be denoted by the same or similar reference numerals, and redundant descriptions will not be provided or will only be briefly described. Descriptions focusing on differences from the above example embodiments will be mainly provided.

Referring to FIGS. 12 and 13, an optical member 100 according to this example embodiment of the present disclosure may further include a low-refractive layer 20 disposed on the upper face 10a of the light guide plate 10, a wavelength conversion layer 30 disposed on the low-refractive layer 20, and a passivation layer 40 disposed on the wavelength conversion layer 30. The light guide plate 10, the low-refractive layer 20, the wavelength conversion layer 30, the passivation layer 40 and the optical sheet 70 may be integrally combined.

The low-refractive layer 20 interposed between the light guide plate 10 and the wavelength conversion layer 30 to form the interface with the upper face 10a of the light guide plate 10 has a refractive index lower than that of the light guide plate 10, so that the total reflection is made on the upper face 10a of the light guide plate 10. In addition, the low-refractive layer 20 has a refractive index lower than that of the wavelength conversion layer 30 disposed thereon, so that more total reflection can be made compared to when the wavelength conversion layer 30 is disposed directly on the upper face 10a of the light guide plate 10.

The difference between the refractive index of the light guide plate 10 and the refractive index of the low-refractive layer 20 may be 0.2 or more. The upper limit of the difference between the refractive index of the light guide plate 10 and the refractive index of the low-refractive layer 20 is not specifically limited, but may be 1.0 or less, taking into account the refractive indices of the light guide plate 10 and the low-refractive layer 20. It is, however, to be understood that this is merely illustrative. The refractive index of the low-refractive layer 20 may range from 1.2 to 1.4. Typically, the fabricating cost is exponentially increased as the refractive index of the solid medium approaches 1.0. Accordingly, if the refractive index of the low-refractive layer 20 is 1.2 or more, it is possible to prevent the fabricating cost from increasing too much. In order to make the total reflection critical angle of the upper face 10a of the light guide plate 10 sufficiently small, the refractive index of the low-refractive layer 20 may be 1.4 or less.

In an example embodiment, the low-refractive layer 20 having a refractive index of approximately (about) 1.25 may be employed. The low-refractive layer 20 may include voids so as to achieve the above-mentioned low refractive index. The voids may be made in vacuum or may be filled with an air layer, gas, and/or the like. The space of the voids may be defined by particles, matrices, and so on. The voids will be described in more detail with reference to FIGS. 14 and 15.

Figure 14:
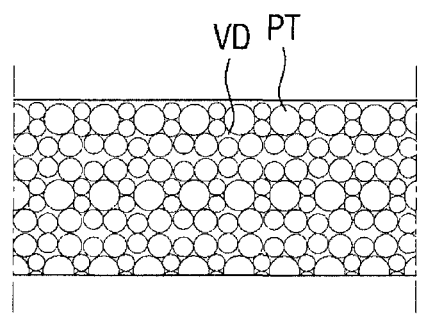
FIGS. 14 and 15 are cross-sectional views of low-refractive layers according to various example embodiments.
Figure 15:
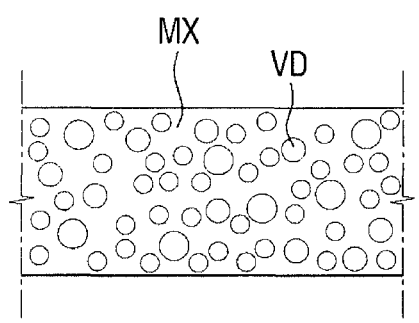

FIGS. 14 and 15 are cross-sectional views of the low-refractive layer 20 according to various example embodiments. Referring to FIGS. 14 and 15, the low-refractive layer 20 may include particles PT and voids VD as shown in FIG. 14. For example, the particles PT may be coupled with one another in the low-refractive layer 20, such that the voids VD may be formed between the particles PT. All or some of the voids VD may be connected between the particles PT.

As shown in FIG. 15, the low-refractive layer 20 may include a matrix MX formed of a material such as a foaming resin and a plurality of voids VD disposed therein. When the low-refractive layer 20 includes voids VD, the overall refractive index of the low-refractive layer 20 has a value between the refractive index of the particles PT/the matrix MX and the refractive index of the voids VD.

Accordingly, even if a material having a refractive index of 1.4 or more is used as the particles PT/matrix MX, the overall refractive index of the low-refractive layer 20 may have a value of 1.4 or less, for example, approximately 1.25. In an example embodiment, the particles PT/matrix MX may be made of an organic material such as siloxane. However, they may be made of other organic or inorganic materials in other implementations. In an example embodiment, the low-refractive layer 20 may further include a filler to adjust the refractive index and the intensity of the low refractive layer 20.

The thickness of the low-refractive layer 20 may range from 0.4 μm to 2 μm. When the thickness of the low-refractive layer 20 is 0.4 μm or more in the visible light wavelength range, an effective (or suitable) optical interface can be formed with the upper surface of the light guide plate 10, so that the overall reflection according to Snell's law can be made well on the upper surface of the light guide plate 10. If the low-refractive layer 20 is too thick, the thickness of the optical member 100 may be increased, which is undesirable, the fabricating cost may be increased, and the luminance of the optical member 100 may be lowered. Accordingly, the low-refractive layer 20 may have a thickness of 2 μm or less. It is, however, to be understood that this is merely illustrative.

The low-refractive layer 20 may cover most of the upper face 10a of the light guide plate 10 and may expose a part of the edge of the light guide plate 10. In other words, the side face 10s of the light guide plate 10 may protrude from a side face 20s of the low-refractive layer 20. The portions of the upper face 10a of the light guide plate 10 that are not covered by the low-refractive layer 20 (via which the low-refractive layer 20 is exposed) provide the space in which the side surfaces 20s of the low-refractive layer 20 can be stably covered by the passivation layer 40.

The low-refractive layer 20 may be formed by coating or the like. For example, the low-refractive layer 20 may be formed by slit coating the composition for the low-refractive layer 20 on the upper face 10a of the light guide plate 10, followed by drying and curing. It is, however, to be understood that the present disclosure is not limited thereto.

On the upper face of the low-refractive layer 20, the wavelength conversion layer 30 is disposed. The wavelength conversion layer 30 converts the wavelength of at least a part of incident light. The wavelength conversion layer 30 may include a binder layer and wavelength conversion particles dispersed in the binder layer.

The wavelength conversion layer 30 may further include scattering particles dispersed in the binder layer in addition to the wavelength conversion particles. The binder layer is a medium in which the wavelength conversion particles are dispersed and may be made of various suitable resin compositions. It is, however, to be understood that the present disclosure is not limited thereto. The binder layer may be any suitable medium, irrespective of its name, additional other functionalities and/or its composition material, as long as it can disperse the wavelength conversion particles and/or the diffusion particles.

The wavelength conversion particles are for converting the wavelength of incident light, and may be, for example, quantum dots (QD), a fluorescent material, and/or a phosphorescent material. Quantum dots, which are an example of wavelength conversion particles, will be further described. A quantum dot is a material with a crystal structure of several nanometers in size, and consisting of hundreds to thousands of atoms. It exhibits the quantum confinement effect which leads to an increase in the energy band gap due to the small size. When a light of a wavelength having an energy level higher than the band gap is incident on a quantum dot, the quantum dot is excited by absorbing the light and relaxed to the ground state while emitting light of a particular wavelength. The wavelength of the emitted light has a value corresponding to the band gap. By adjusting the size and composition of the quantum dots, the luminescence characteristics due to the quantum confinement effect can be adjusted.

The wavelength conversion particles may include a number of wavelength conversion particles that convert incident light to different wavelengths. For example, the wavelength conversion particles may include first wavelength conversion particles that convert incident light of a specific wavelength into a first wavelength to emit it, and second wavelength conversion particles that convert the incident light into a second wavelength to emit it.

In an example embodiment, the light emitted from the light sources and incident on the wavelength conversion particle may be blue light having a blue wavelength, the first wavelength may be a green wavelength, and the second wavelength may be a red wavelength. For example, the blue wavelength may have a peak at 420 nm to 470 nm, the green wavelength may have a peak at 520 nm to 570 nm, and the red wavelength may have a peak at 620 nm to 670 nm. It is, however, to be understood that the wavelengths of red, green and blue are not limited to the above numerical values and encompass all wavelength ranges that can be recognized as red, green and blue in the art.

In the above example embodiment, the blue light incident on the wavelength conversion layer 30 passes through the wavelength conversion layer 30, a part of which is incident on the first wavelength conversion particles to be converted into the green wavelength and emitted.

Another part of the light is incident on the second wavelength conversion particles to be converted into the red wavelength and emitted. Yet another part of the light is incident neither on the first wavelength conversion particles nor the second wavelength conversion particles, and may be emitted as it is.

Accordingly, the light passing through the wavelength conversion 30 may include all (or substantially all) of the blue wavelength light, the green wavelength light and the red wavelength light. By adjusting the ratio of the emitted lights of different wavelengths appropriately, white light or light of another color can exit and be displayed.

The lights converted in the wavelength conversion layer 30 are concentrated within a narrow range of specific wavelengths and have a sharp spectrum with a narrow half width. Therefore, by filtering the light of such spectrum by a color filter to reproduce colors, the color gamut can be improved effectively. Unlike the above example embodiment, in some embodiments, the incident light may be light of a short wavelength such as ultraviolet light, and three kinds of wavelength conversion particles may be disposed in the wavelength conversion layer 30 for converting the incident light into blue, green and red wavelengths, thereby emitting white light.

The wavelength conversion layer 30 may further include scattering particles. The scattering particles may be non-quantum dots, which do not perform wavelength conversion. The scattering particles scatter the incident light so that more incident light can be incident on the wavelength conversion particles. In addition, the scattering particles may regulate the exit angles of lights having different wavelengths.

For example, when a part of the incident light is incident on the wavelength conversion particles and then the wavelength of light is converted and emitted, the emitting direction has a random scattering characteristic. If there are no scattering particles in the wavelength conversion layer 30, the green and red wavelengths exiting after collision with the wavelength conversion particles have scattering characteristics, but the blue wavelengths exiting without collision with the wavelength conversion particles have no scattering characteristic. Therefore, the amount of exiting light of the blue/green/red wavelength may become different depending on the exit angle. The scattering particles provide scattering characteristics even to the light of the blue wavelength that do not collide with the wavelength conversion particles, so that the exiting angles of the light having different wavelengths can be regulated. As the scattering particles, $TiO_2$, $SiO_2$ and/or the like may be used.

The wavelength conversion layer 30 may be thicker than the low-refractive layer 20. The thickness of the wavelength conversion layer 30 may range approximately from 10 to 50 µm. It is, however, to be understood that this is merely illustrative. The wavelength conversion layer 30 may cover an upper surface 20a of the low-refractive layer 20 and may completely overlap the low-refractive layer 20.

The passivation layer 40 may be disposed on the low-refractive layer 20 and the wavelength conversion layer 30. The passivation layer 40 serves to prevent or reduce the permeation of moisture and/or oxygen (hereinafter referred to as "moisture/oxygen"). The passivation layer 40 may include an inorganic material. For example, the passivation layer 40 may include silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, and/or a metal thin film with light transmittance.

The passivation layer 40 may completely cover the low-refractive layer 20 and the wavelength conversion layer 30. That is, the passivation layer 40 may completely overlap with and extend outward from the wavelength conversion layer 30, to cover side surfaces 30s of the wavelength conversion layer 30 and the side surfaces 20s of the low refractive layer 20.

The passivation layer 40 may extend to the upper face 10a of the light guide plate 10 exposed (e.g., not covered) by the low-refractive layer 20, so that a part of the edge of the passivation layer 40 may come in contact with the upper face 10a of the light guide plate 10. Outer edge of side surfaces 40s of the passivation layer 40 may be aligned with the respective side face 10s of the light guide plate 10.

The thickness of the passivation layer 40 may be smaller than that of the wavelength conversion layer 30 and may be similar to or smaller than that of the low refractive layer 20. The thickness of the passivation layer 40 may range from 0.1 to 2 µm. If the thickness of the passivation layer 40 is 0.1 µm or more, the passivation layer 40 can suitably prevent (or reduce) the permeation of moisture/oxygen. For example, if the thickness is 0.3 µm or more, the passivation layer 30 can effectively (or suitably) prevent (or reduce) permeation of moisture/oxygen.

The passivation layer 40 having a thickness of 2 µm or less is advantageous in terms of reducing the size and increasing the transmittance. The wavelength conversion layer 30, especially the wavelength conversion particles included therein, are vulnerable to moisture/oxygen. However, since an upper surface 30a and the side surfaces 30s of the wavelength conversion layer 30 are covered and protected by the passivation layer 40, the permeation of the moisture/oxygen can be blocked or at least reduced (hereinafter referred to as "blocking/decreasing").

A lower surface 30b of the wavelength conversion layer 30 is in contact with the upper surface 20a of the low-refractive layer 20. When the low-refractive layer 20 contains voids VD or an organic material, moisture can move inside the low-refractive layer 20, and accordingly moisture/oxygen may permeate through the lower surface 30b of the wavelength conversion layer 30. However, when the light guide plate 10 made of an inorganic material such as glass is disposed on a lower surface 20b of the low-refractive layer 20, it is possible to further block/decrease the permeation of the moisture/oxygen, thereby preventing or reducing the deterioration of the wavelength conversion particles by the moisture/oxygen.

The passivation layer 40 may be formed by deposition and/or the like. For example, the passivation layer 40 may be formed by chemical vapor deposition on the light guide plate 10 on which the low-refractive layer 20 and the wavelength conversion layer 30 are sequentially formed. However, this is merely illustrative. A variety of other suitable stacking methods may be employed.

As described above, the optical member 100 may simultaneously (or concurrently) perform the light guide function and the wavelength conversion function as an integrated single member. Having an integrated single member can simplify the assembly process of the display device. In addition, in the optical member 100, the low-refractive layer 20 is disposed on the upper face 10a of the light guide plate 10, such that the total reflection can be made effectively (or suitably) on the upper face 10a of the light guide plate 10. In addition, the low-refractive layer 20 and the wavelength conversion layer 30 are sealed by the passivation layer 40 and/or the like, such that it is possible to prevent or reduce the deterioration of the wavelength conversion layer 30. According to this example embodiment of the present disclosure, the optical member 100 may further include the low-refractive layer 20, the wavelength conversion layer 30, and the passivation layer 40, to improve the color gamut.

Figure 16:
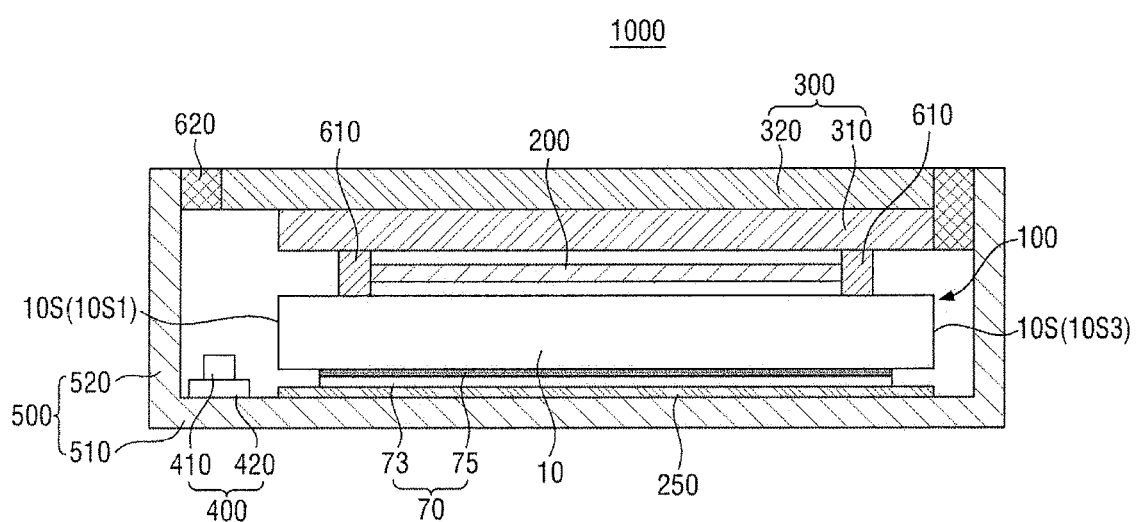
FIG. 16 is a cross-sectional view of a display device according to an example embodiment of the present disclosure.

FIG. 16 is a cross-sectional view of a display device according to an example embodiment of the present disclosure. Referring to FIG. 16, a display device 1000 includes light sources 400, an optical member 100 disposed on an emission path of the light sources 400, and a display panel 300 disposed above the optical member 100. Any of the optical members 100 according to the above-described example embodiments of the present disclosure may be employed as the optical member 100. In FIG. 16, solely for illustrative purposes, the optical member 100 of FIG. 2 is employed.

The light sources 400 are disposed on one side of the optical member 100. The light sources 400 may be disposed adjacent to the light incidence face 10s1 of the light guide plate 10 of the optical member 100. The light sources 400 may include either point light sources or line light sources. The point light sources may be light-emitting diode (LED) light sources 410. The plurality of LED light sources 410 may be mounted on a printed circuit board 420. The light emitted from the LED light sources 410 is incident on the light guide plate 10 of the optical member 100 and may be output toward the display panel 300 by the optical sheet 70 disposed under the light guide plate 10.

The display device 1000 may further include a reflection member 250 disposed below the optical member 100. The reflection member 250 may include a reflection film or a reflective coating layer, and the reflection member 250 may reflect the light emitted through the lower surface of the optical sheet 70 of the optical member 100 back to the light guide plate 10.

The display panel 300 is disposed above the optical member 100. The display panel 300 receives light from the optical member 100 to display images thereon. Examples of such light-receiving display panels that display images by receiving light may include a liquid-crystal display panel, an electrophoretic panel, etc. Although a liquid-crystal display panel will be described as an example in the following description, any of a variety of suitable light-receiving display panels can be employed. The display panel 300 may include a first substrate 310, a second substrate 320 facing the first substrate 310, and a liquid-crystal layer disposed (e.g., positioned) between the first substrate 310 and the second substrate 320.

The first substrate 310 and the second substrate 320 may overlap with each other, and one of the substrates may be larger than the other substrate so that the former may further protrude outward. In the drawing, the second substrate 320 disposed on the first substrate 310 is larger and protrudes from the side of the first substrate 310 where the light sources 400 are disposed, and a space for mounting a driving chip or an external circuit board may be formed under the protruding portion of the second substrate 320. It is, however, to be understood that the present disclosure is not limited thereto. The first substrate 310 disposed under the second substrate 320 may be larger and protrude outward.

In the display panel 300, the first substrate 310 and the second substrate 320 overlap with each other, except for the protruding portion, and may be substantially aligned with the side surface 10s of the light guide plate 10 of the optical member 100. The optical member 100 may be coupled with the display panel 300 through an inter-module coupling member 610. The inter-module coupling member 610 may have a rectangular frame shape. The inter-module coupling member 610 may be disposed at the edge of each of the display panel 300 and the optical member 100. The lower surface of the inter-module coupling member 610 may be disposed on the upper surface of the light guide plate 10 of the optical member 100. The inter-module coupling member 610 may include a polymer resin, an adhesive tape, etc.

The inter-module coupling member 610 may also be used to block light. For example, the inter-module coupling member 610 may include a light-absorbing material such as a black pigment or a dye, or may include a reflective material. The display device 1000 may further include a housing 500.

The housing 500 may include a bottom face 510 and side walls 520 connected to the bottom face 510. The light sources 400, the optical member 100, the display panel 300 and the reflective member 250 may be accommodated in the space defined by the bottom face 510 and the side walls 520. That is, the light sources 400, the reflective member 250, the optical member 100 and the display panel 300 may be disposed on the bottom face 510 of the housing 500. The height of the side walls 520 of the housing 500 may be substantially equal to the height of the optical member 100 and the display panel 300 placed inside the housing 500. The display panel 300 may be disposed adjacent to the upper end of the side walls of the housing 500, and they may be coupled with each other by a housing coupling member 620. The housing coupling member 620 may have a rectangular frame shape. The housing coupling member 620 may include a polymer resin, an adhesive tape, and/or the like.

The display device 1000 may further include at least one optical film 200. The optical film 200 may be accommodated in the space surrounded by the inter-module coupling member 610 between the optical member 100 and the display panel 300. The side surfaces of the optical film 200 may be in contact with and attached to the inner side surfaces of the inter-module coupling member 610. Although in FIG. 16, the optical film 200 and the optical member 100 are spaced apart from each other, and the optical film 200 and the display panel 300 are spaced apart from each other, this is merely illustrative. They are not necessarily spaced apart from each other.

The optical film 200 may be a prism film, a diffusion film, a micro-lens film, a lenticular film, a polarizing film, a reflective polarizing film, a retardation film, and/or the like. In the display device 1000, a plurality of optical films 200 of the same type (kind) or different types (kinds) may be disposed.

Figure 39:
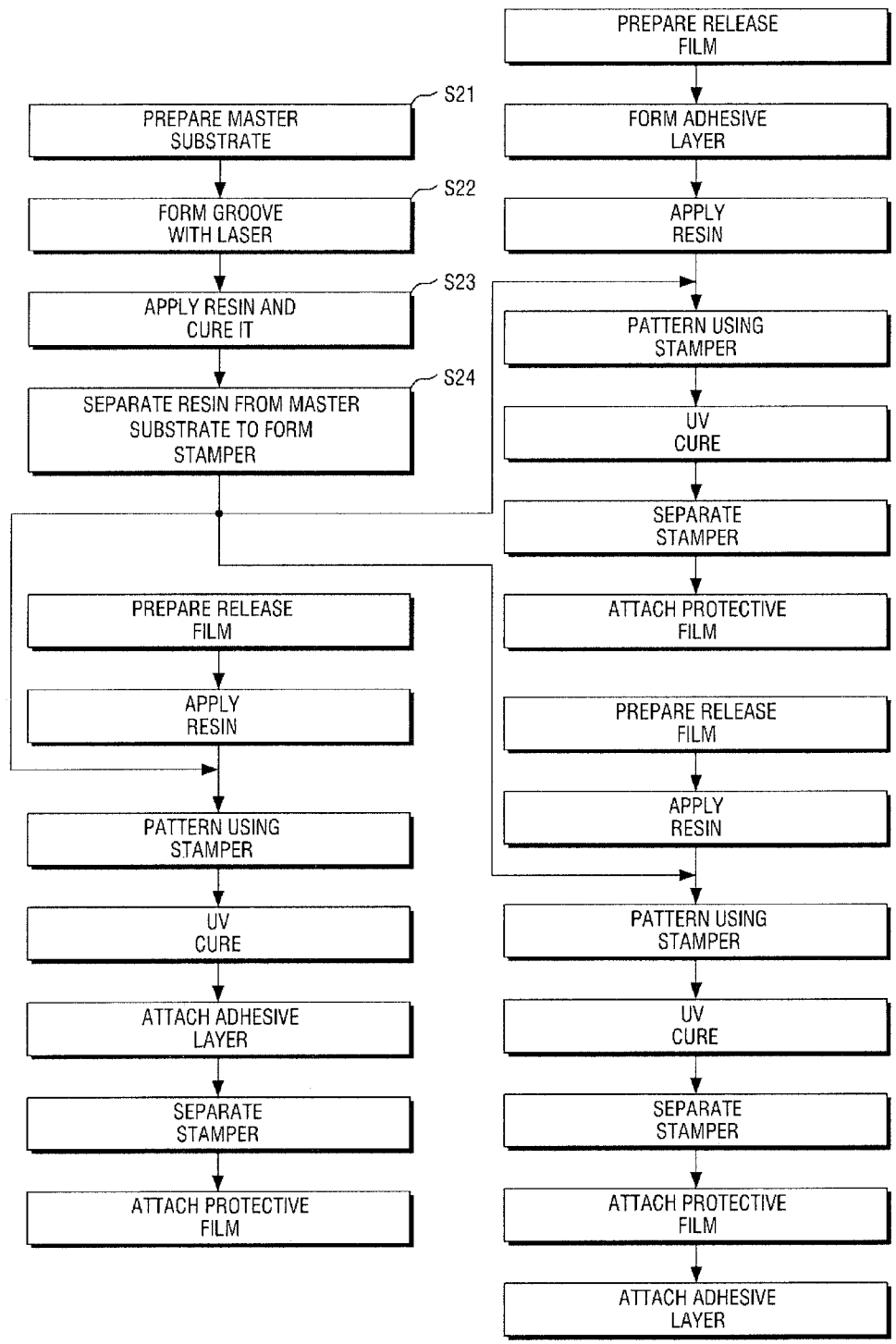
FIG. 39 is a flowchart for illustrating acts of a method for fabricating an optical member according to an example embodiment of the present disclosure.

Hereinafter, a method for fabricating an optical member according to an example embodiment of the present disclosure will be described with reference to FIGS. 17 to 38. FIG. 39 is a flowchart for illustrating a method for fabricating an optical member according to an example embodiment of the present, disclosure. Descriptions will be made in conjunction with FIG. 39.

Figure 17:
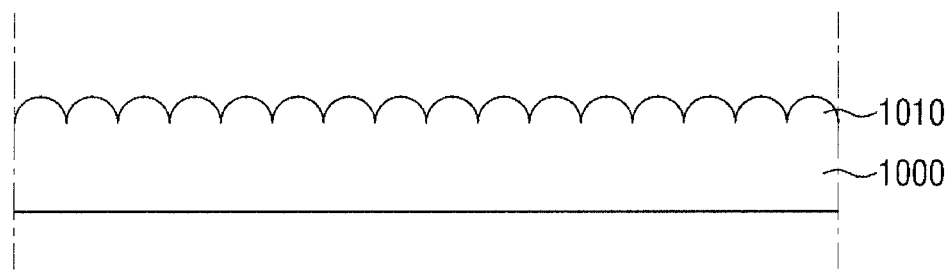
FIGS. 17 to 20 are views for illustrating a method for fabricating a stamper according to an example embodiment of the present disclosure.

FIGS. 17 to 20 are views for illustrating acts of a method for fabricating a stamper according to an example embodiment of the present disclosure. Referring to FIG. 17, a master substrate 1000 is prepared, which has a first master pattern 1010 having the same shape as the first pattern 71 (see e.g., FIG. 5) (step S21 in FIG. 39).

The master substrate 1000 may be made of polymethylmethacrylate (PMMA), PC, PET, and/or the like. The first master pattern 1010 may be formed by patterning the master substrate 1000. For example, the pattern may be formed by using a pattern roll during the process of extruding the substrate. The master substrate 1000 may be in the form of a hexahedron having a rectangular shape when viewed from the top. A first master pattern 1010 of one or more lenticular shapes continuously extended in one direction may be engraved on the upper surface.

Figure 18:
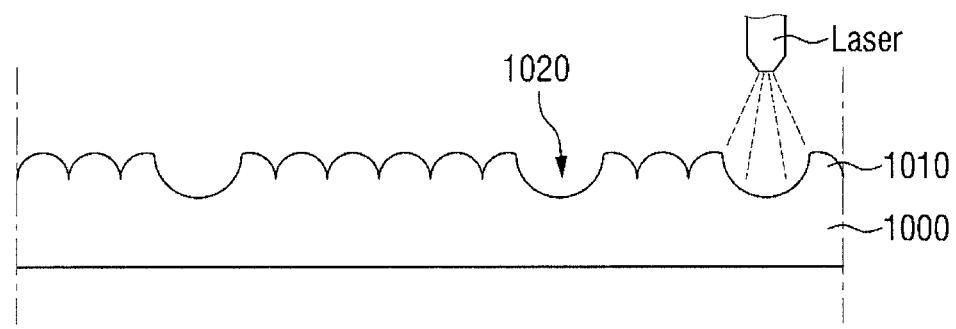

Subsequently, as shown in FIG. 18, a second master pattern 1020 is formed on the surface of the first master pattern 1010 of the master substrate 1000 (step S22 in FIG. 39). For example, the second master pattern 1020 may be formed by irradiating a laser. The laser may be irradiated along predetermined (or set) positions. That is, the second master pattern 1020 may be predetermined so that it has the same arrangement as that of the second pattern 72.

Figure 19:
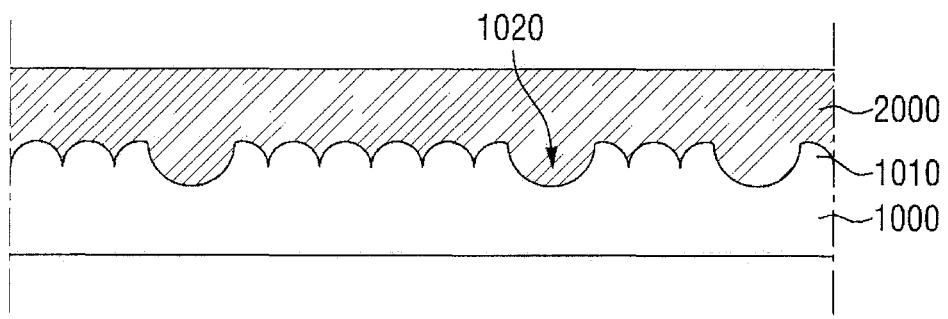
Figure 20:
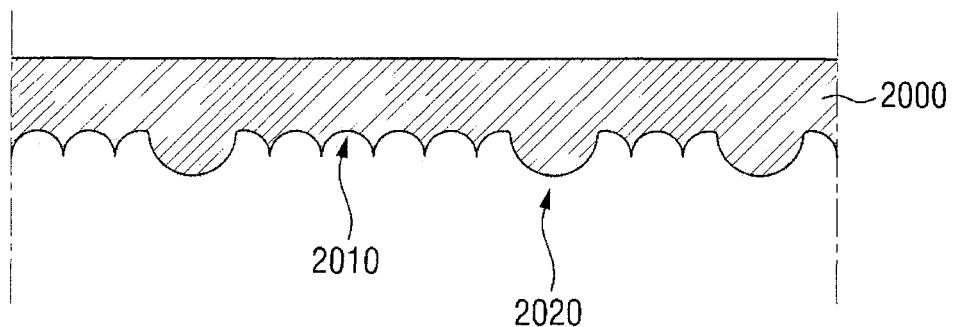

Subsequently, as shown in FIGS. 19 and 20, a resin is coated on one surface of the master substrate 1000, and then the resin is cured to form a stamper 2000 (steps S23 and S24 in FIG. 39). The one surface of the master substrate 1000 refers to the surface on which the first master pattern 1010 and the second master pattern 1020 are formed.

More specifically, the resin for the stamper may be applied on the surface of the master substrate 1000 using a slit nozzle. The resin for the stamper may be made of a transparent material allowing ultraviolet rays to transmit. Subsequently, the resin is cured by irradiating ultraviolet ray and/or by applying heat, and then the cured resin is separated from the master substrate 1000 to complete the stamper 2000.

The patterns 2010 and 2020 formed on the stamper 2000 may be opposite to the patterns 1010 and 1020 formed on the master substrate 1000. That is, a counter-relief pattern 2010 of semicircles in the cross section may be formed to extend in a line shape continuously in one direction, and a relief pattern 2020 of semicircles may be formed on the counter-relief pattern.

FIGS. 21 to 26 are views for illustrating acts of a method for fabricating an optical member according to an example embodiment of the present disclosure by a stamper.

Figure 21:
FIGS. 21 to 26 are views for illustrating acts of a method for fabricating an optical member according to an example embodiment of the present disclosure by a stamper.
Figure 22:
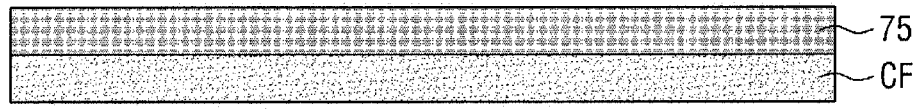

Referring to FIGS. 21 and 22, an adhesive layer 75 is applied onto one surface of a release film CF. The release film may be made of polyethylene terephthalate (PET), and the adhesive layer 75 may be made of pressure sensitive adhesive (PSA), but the present disclosure is not limited thereto. The adhesive layer 75 may be made up of a plurality of layers.

Figure 23:
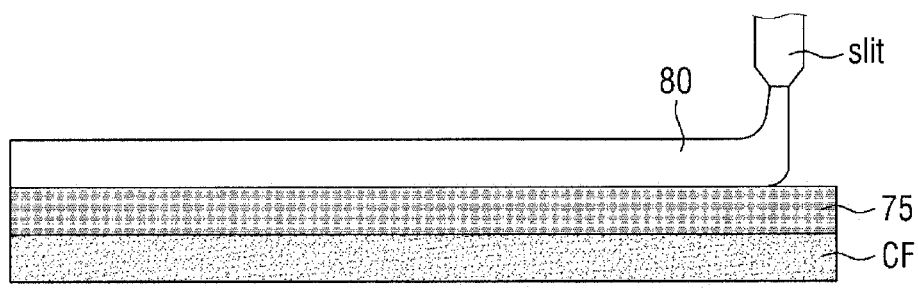

Referring to FIG. 23, the resin 80 is applied directly onto the upper surface of the adhesive layer 75 using a slit nozzle, for example. That is, the resin 80 is directly applied onto the adhesive layer 75 without a base film. Accordingly, the adhesive layer 75 is formed on the upper surface of the release film CF, and the resin is formed directly on the upper surface of the adhesive layer 75.

The resin 80 may be a photocurable resin and may be applied with a thickness of approximately (about) 40 µm or less. Typically, when the resin 80 is cured by UV radiation, the longer the time of exposure to ultraviolet rays, the more the resin 80 is likely to become yellowish. When the thickness of the resin 80 is 40 µm or less, the resin 80 can be effectively cured without yellowing the resin 80. Although there is no specific lower limit of the thickness of the resin 80, it is desirable that the resin 80 is 20 µm or more thick, taking into account the thickness of the optical sheet 70 to be formed during a subsequent process. It is, however, to be understood that the present disclosure is not limited thereto.

The resin 80 may be comprised of acrylate, urethane, urethane acrylate, silicone and epoxy or combinations thereof, and may include UV initiators and binders. It is, however, to be understood that this is merely illustrative.

Figure 24:
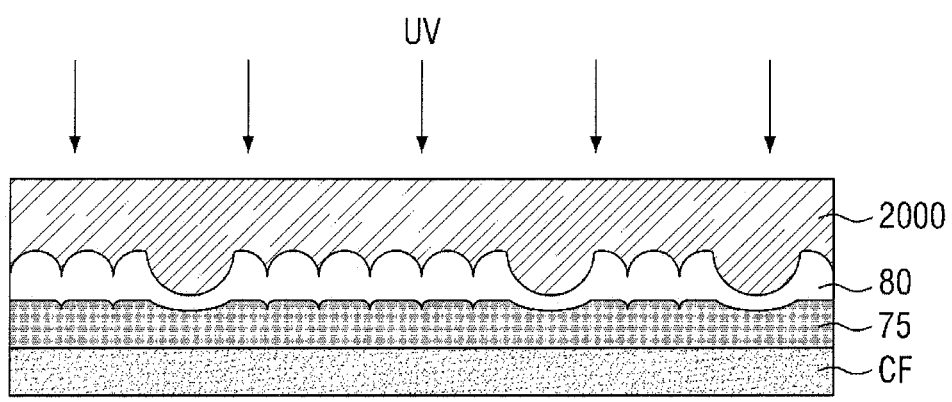

Referring to FIG. 24, a pattern is formed on the resin 80 using a stamper 2000 having the relief pattern 2010 and the counter-relief pattern 2020 formed thereon. When the stamper 2000 is pressed against the resin 80, the patterns 2010 and 2020 of the stamper 2000 are transferred to the resin 80, so that an optical pattern opposite to the patterns 2010 and 2020 of the stamper 2000 is formed. For example, one or more lenticular-shaped patterns that extend continuously in one direction and a counter-relief pattern depressed in the direction in which the release film on the lenticular shaped pattern is disposed (e.g., in the direction toward the release film CF) may be formed.

At this time, the pressure of the stamper 2000 may be transferred to the adhesive layer 75, such that a slightly depressed pattern conforming to the patterns 2010 and 2020 of the stamper 2000 may be formed on the adhesive layer 75. In a comparable optical member, when a base film is disposed between the adhesive layer and the resin, the pressure of the stamper patterns is not transferred to the adhesive layer due to the rigidity of the base film. On the contrary, in the present embodiments, when the resin 80 is applied directly onto the adhesive layer 75 without a base film to form the pattern, a fine pattern may be formed on the adhesive layer 75 due to the pressure of the stamper 2000. Then, ultraviolet rays (UV) are irradiated onto the stamper 2000 to cure the resin 80.

Figure 25:
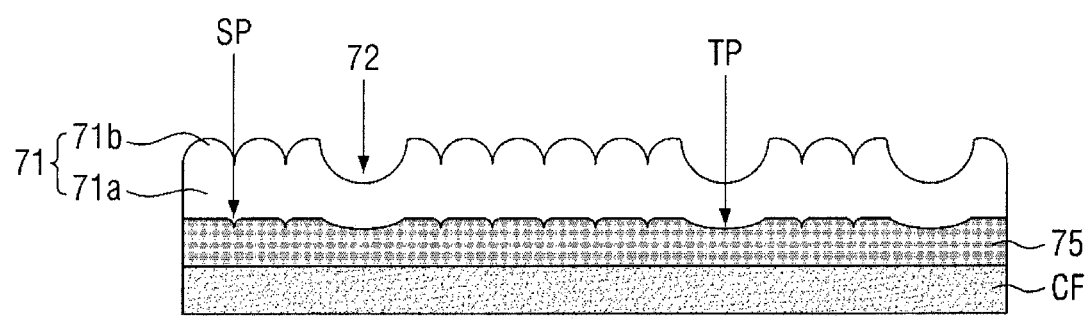

Subsequently, referring to FIG. 25, the stamper 2000 is removed to form an optical pattern 73 (see e.g., FIG. 4). By performing the curing process, the coupling force within resin 80 can be increased, thereby preventing or reducing the possibility of the resin 80 being torn off.

The layer on which the resin is applied (e.g., the resulting optical pattern 73) may include a first pattern 71 in a lenticular shape including a base portion 71a and a pattern portion 71b, and a second pattern 72 comprised of shapes recessed from the surface of the first pattern 71. The adhesive layer 75 may include a third pattern SP of recesses depressed toward the release film CF in line with the depressed portions DP (see e.g., FIG. 5) of the first pattern 71, and a fourth pattern TP of recesses depressed toward the release film CF in line with the second pattern 72.

The third pattern SP that is depressed toward the light guide plate 10 may be included. For example, the third pattern SP depressed toward the light guide plate 10 may be formed on the lower surface of the adhesive layer 75, which is in contact with the first pattern 71.

Figure 26:
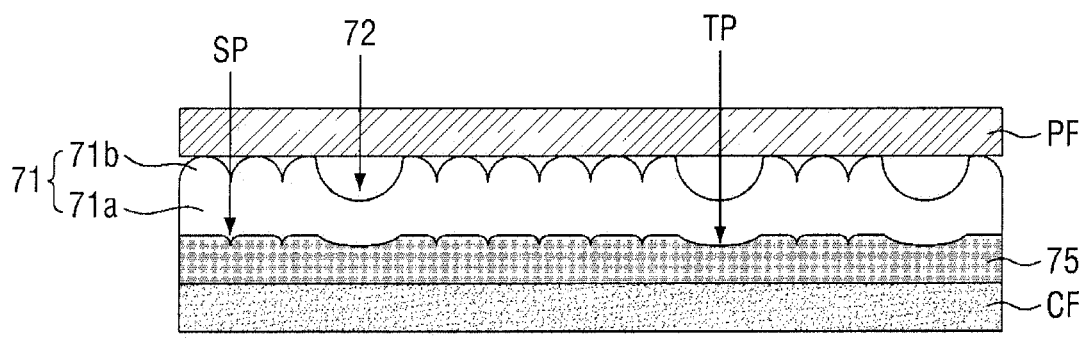

Subsequently, referring to FIG. 26, a protective film PF may be attached over the first pattern 71 and the second pattern 72 to protect the first pattern 71 and the second pattern 72, thus completing the optical sheet 70. The protective film PF may be made of, but is not limited to, polypropylene (PP), polyethylene (PE), polyolefin (PO), etc. The release film CF is removed from the completed optical sheet 70 to expose the lower surface of the adhesive layer 75, and the lower surface of the adhesive layer 75 is attached to the back surface of the light guide plate 10, to produce the optical member 100.

As described above, in the optical member 100, the optical pattern 73 (see e.g., FIG. 3) is formed directly on the adhesive layer 75, to eliminate the base film that may be disposed between the optical pattern and the adhesive layer in a comparable optical member, such that the manufacturing process can be simplified, the fabricating cost can be saved or reduced, and the uniformity of luminance can be maintained in a high temperature environment.

FIGS. 27 to 38 are views for illustrating acts of a method for fabricating an optical member according to another example embodiment of the present disclosure by a stamper. Descriptions will be made in conjunction with FIG. 39. For convenience of illustration, the same or similar elements will be denoted by the same or similar reference numerals, and redundant descriptions of elements that have been described above will not be provided or will only be briefly provided. The following descriptions will be made by focusing on the differences from the above example embodiment.

Figure 27:
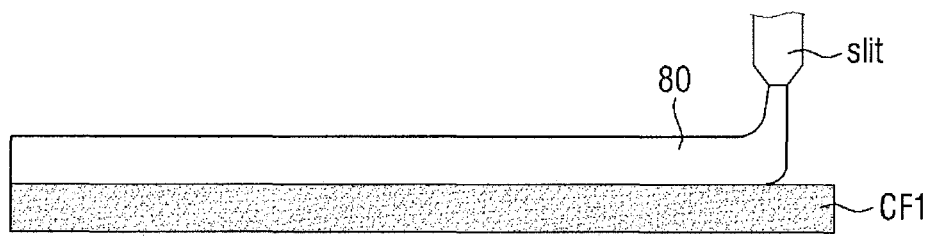
FIGS. 27 to 38 are views for illustrating acts of a method for fabricating an optical member according to another example embodiment of the present disclosure by a stamper.
Figure 28:
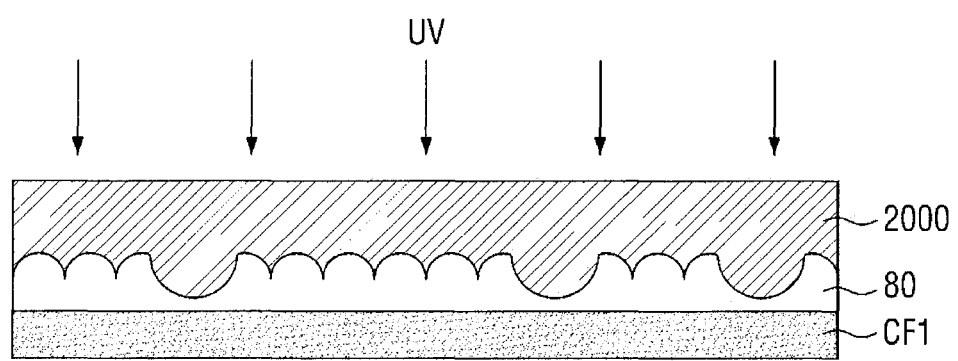

Referring to FIG. 27, a resin 80 is applied onto one surface of a first release film CF1 using a slit nozzle, for example. Subsequently, referring to FIG. 28, a pattern is formed on the resin 80 using the stamper 2000 having the relief pattern 2010 and the counter-relief pattern 2020 formed thereon, and ultraviolet ray (UV) is irradiated from above the stamper 2000 to cure the resin 80.

Figure 29:
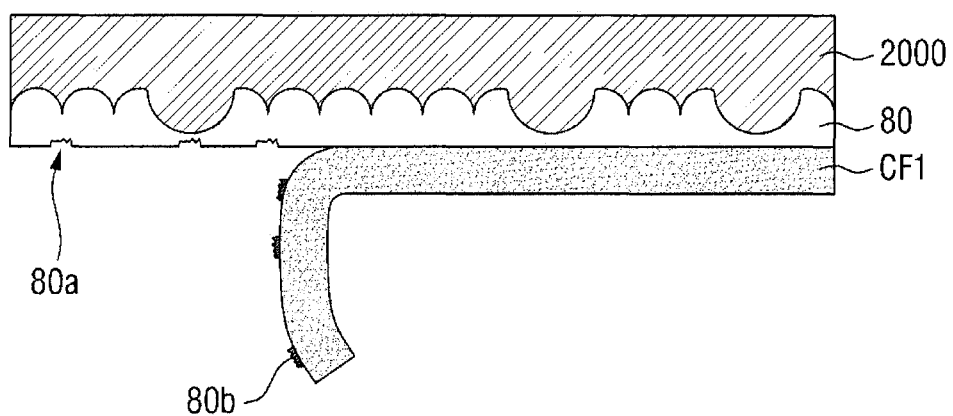

Subsequently, referring to FIG. 29, the first release film CF1 is peeled off. In doing so, a part of the resin 80 may be torn off (e.g., torn). Accordingly, depressed portions 80a may be formed in the lower surface of the resin 80, where portions 80b of the resin 80 are torn off together with the first release film CF1. It is, however, to be understood that the present disclosure is not limited thereto. The resin 80 may not be torn off during the process of peeling off the first release film CF1.

Figure 30:
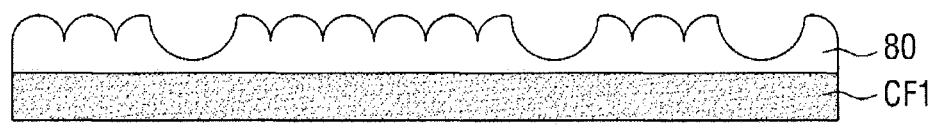
Figure 31:
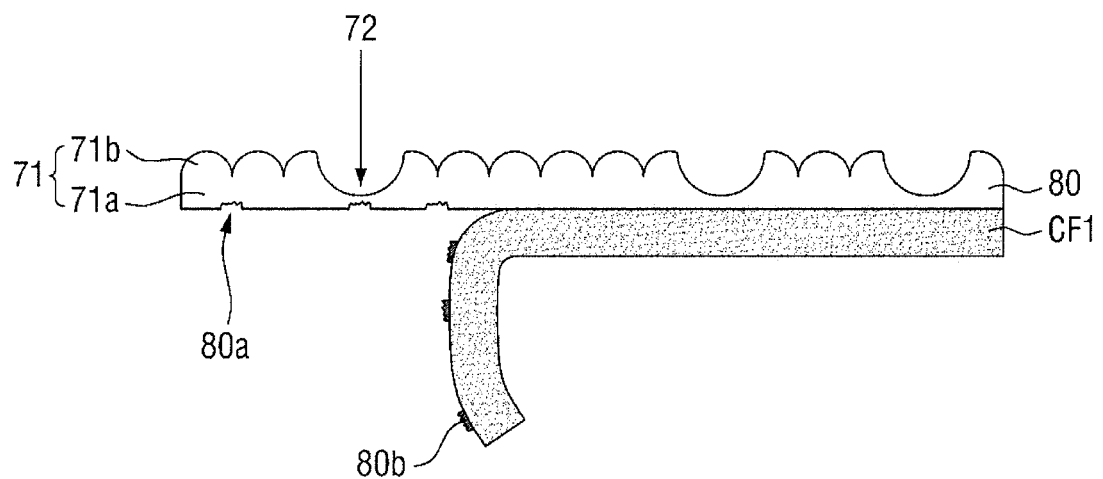

Referring to FIGS. 30 and 31, in yet another example embodiment, the stamper 2000 may be removed before the first release film CF1 is peeled off, and then the first release film CF1 may be peeled off.

Figure 32:
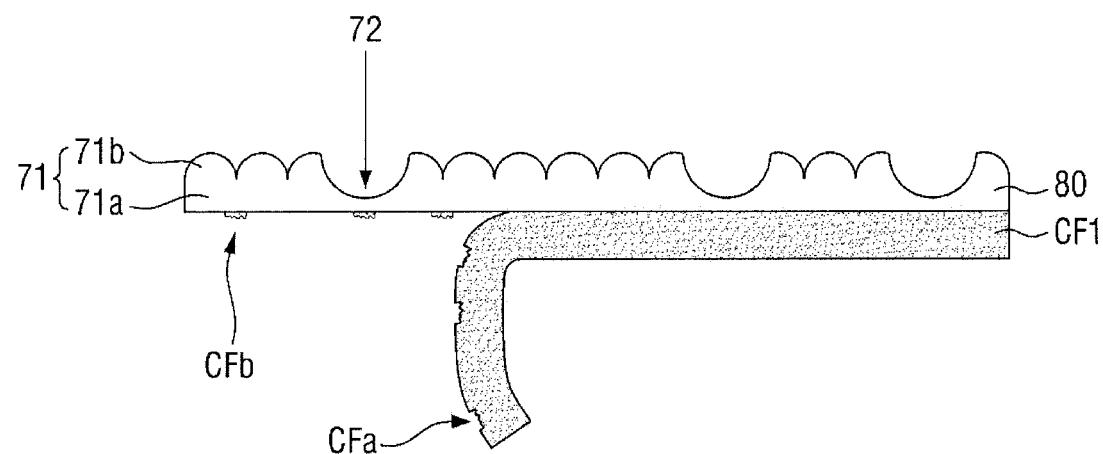

Referring to FIG. 32, one or more parts of the first release film CF1 may be torn off (e.g., torn) during the process of peeling off the first release film CF1, thus forming depressed parts CFa in the first release film CF1. Accordingly, attachments CFb of the first release film CF1 may remain on the lower surface of the resin 80. It is, however, to be understood that the present disclosure is not limited thereto. The first release film CF1 may not be torn off (e.g., torn) during the process of peeling off the first release film CF1.

Figure 33:
Figure 34:
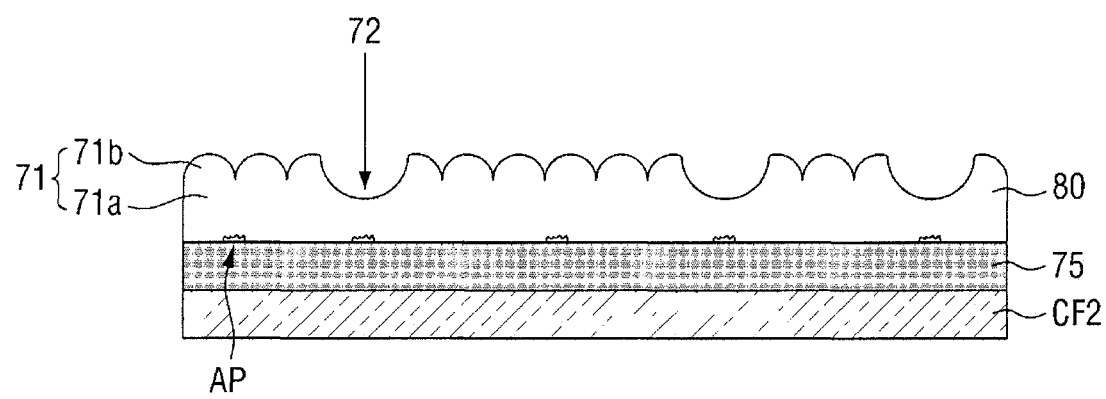

Referring to FIGS. 33 and 34, an adhesive layer 75 may be applied onto one surface of a second release film CF2, and the adhesive layer 75 may be attached to the base portion 71a of the first pattern 71. At this time, by attaching the adhesive layer 75 formed on the second release film CF to the base portion 71a of the first pattern 71, the region where the depressed portions 80a (see FIG. 31) are formed may remain as the air pockets AP.

Figure 36:
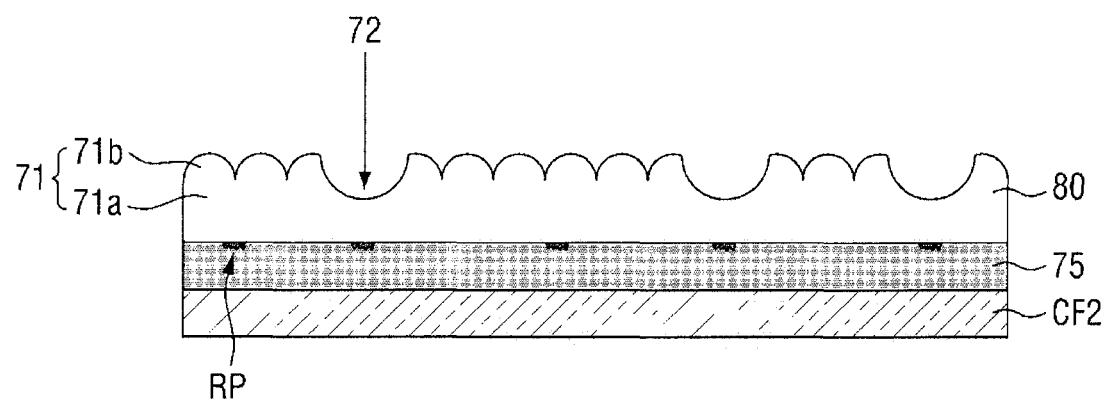

Referring to FIG. 36, the attachments CFb of the first release film CF1 may remain between the adhesive layer 75 and the base portion 71a of the first pattern 71 as residue RP. It is, however, to be understood that the present disclosure is not limited thereto. The resin 80 and/or the first release film CF1 may not be torn during the process of peeling off the first release film CF1. In this case, no air pocket AP or residue RP may remain between the adhesive layer 75 and the base portions 71a of the first pattern 71 (see e.g., FIG. 38).

Figure 35:
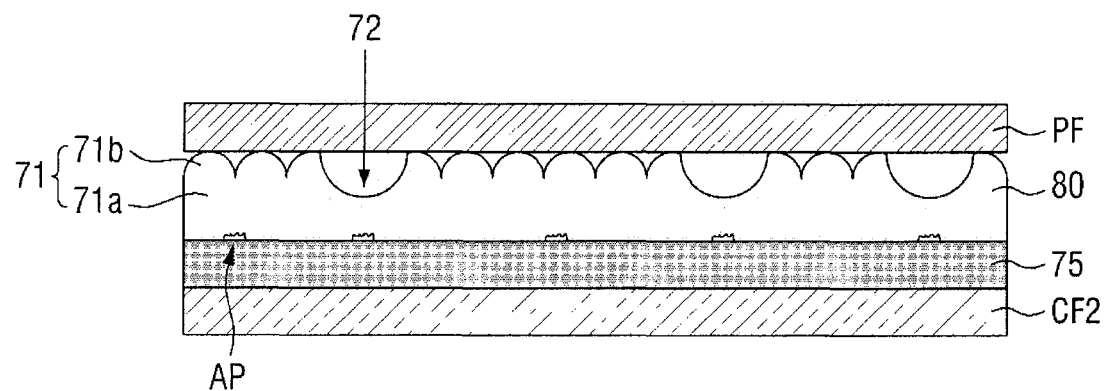
Figure 37:
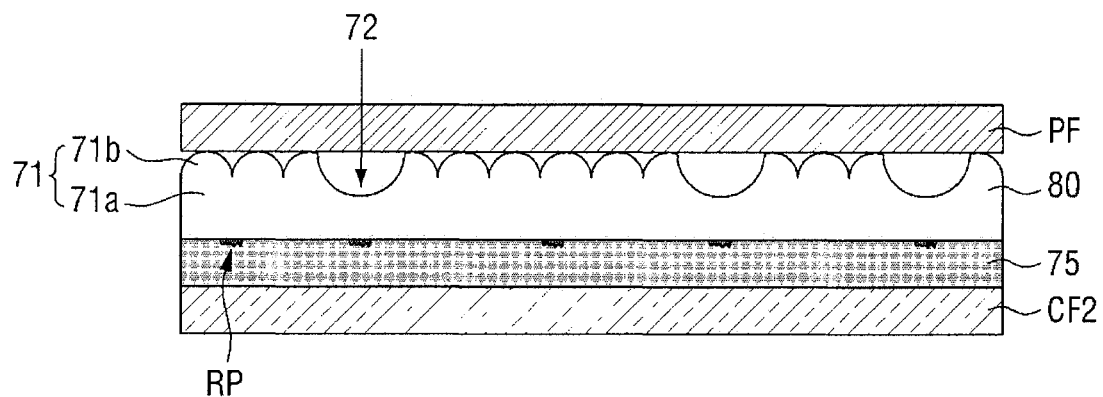
Figure 38:
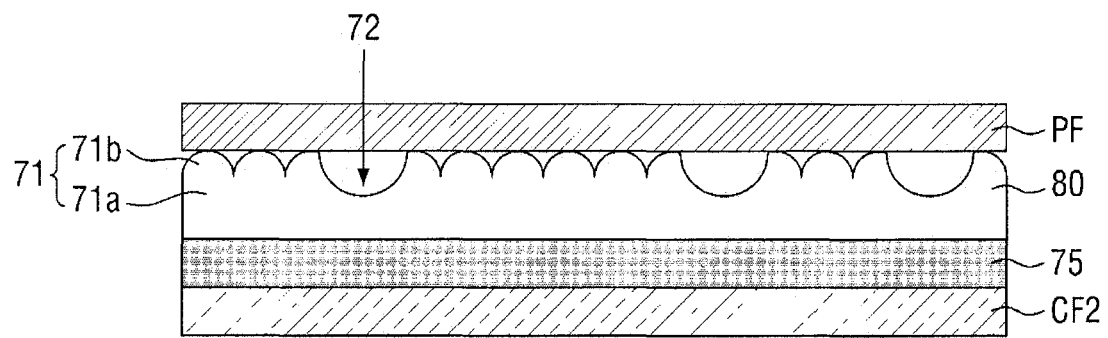

Referring to FIGS. 35 and 37, a protective film PF may be attached over the first pattern 71 and the second pattern 72 to protect the first pattern 71 and the second pattern 72, and to complete the optical sheet 70 (see e.g., FIG. 3). The second release film CF2 may be removed to expose the lower surface of the adhesive layer 75, and the lower surface of the adhesive layer 75 may be attached to the back surface of the light guide plate 10, to produce the optical member 100 (see e.g., FIG. 4).

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The effects of the present invention are not limited by the foregoing, and other various effects are anticipated herein.

Although the example embodiments of the present invention have been disclosed herein for illustrative purposes, those skilled in the art will appreciate that various modifications, additions and substitutions are possible, without departing from the scope and spirit of the invention as disclosed in the accompanying claims and equivalents thereof.

What is claimed is:

1. An optical member comprising:
   a light guide plate; and
   an optical sheet on a first surface of the light guide plate,
   wherein the optical sheet comprises:
      an adhesive layer and
      an optical pattern in contact with a first surface of the adhesive layer,
      wherein the optical pattern comprises a first pattern extending in a first direction, and a plurality of second patterns on a surface of the first pattern,
      wherein the first pattern comprises a base portion and a pattern portion protruding convexly from the base portion,
      wherein the optical pattern is coupled with the first surface of the light guide plate via the adhesive layer,
      wherein the plurality of second patterns have a concave shape recessed from the surface of the first pattern,
      wherein the first pattern comprises peak portions having a largest thickness and depressed portions having a smallest thickness,
      wherein the adhesive layer comprises a third pattern of recesses toward a second surface of the adhesive layer, opposite the first surface of the adhesive layer, and
      wherein the recesses of the third pattern are respectively aligned with the depressed portions of the first pattern.

2. The optical member of claim 1, wherein the adhesive layer comprises a fourth pattern of recesses toward a second surface of the adhesive layer, opposite to the first surface of the adhesive layer,
   wherein the recesses of the fourth pattern are respectively aligned with the plurality of second patterns.

3. The optical member of claim 1, wherein the first pattern is a lenticular pattern having a first pitch, and a second pitch of the second pattern is equal to or larger than half the first pitch.

4. The optical member of claim 3, wherein the first pitch is from 20 μm to 200 μm.

5. The optical member of claim 3, wherein a height of the second pattern is equal to or less than 10 μm.

6. The optical member of claim 1, further comprising:
   a low-refractive layer on a second surface of the light guide plate, opposite the first surface, the low-refractive layer having a refractive index smaller than that of the light guide plate.

7. The optical member of claim 6, further comprising:
a wavelength conversion layer on the low-refractive layer; and a passivation layer on the wavelength conversion layer.

8. A method for fabricating the optical sheet of claim 1, the method comprising:
forming the adhesive layer on an upper surface of a release film;
forming a resin layer directly on an upper surface of the adhesive layer; and
transferring a surface shape of a stamper by pressing the resin layer with the stamper to form the optical pattern, wherein the optical pattern has the first pattern extending in one direction and the plurality of second patterns formed on the first pattern, and
wherein the first pattern comprises the base portion and the pattern portion protruding convexly from the base portion.

9. The method of claim 8, wherein the first pattern comprises the peak portions having the largest thickness and the depressed portions having the smallest thickness, and
wherein the transferring comprises forming the third pattern of recesses and a fourth pattern of recesses in the adhesive layer, the third pattern of recesses being respectively aligned with the depressed portion of the first pattern and the fourth pattern of recesses being respectively aligned with the plurality of second patterns.

10. The method of claim 9, wherein the first pattern is a lenticular pattern having a first pitch, and a second pitch of the second pattern is equal to or larger than half the first pitch.

11. The method of claim 10, wherein the first pitch ranges from 20 μm to 200 μm.

12. The method of claim 11, wherein a height of the second pattern is equal to or less than 10 μm.

13. A method for fabricating the optical sheet of claim 1, the method comprising:
forming a resin layer directly on a surface of a first release film and forming the adhesive layer on a surface of a second release film;
pressing the resin layer with a stamper to transfer a surface shape of the stamper and form the optical pattern;
peeling off the first release film to expose a surface of the optical pattern; and
attaching the adhesive layer on the second release film to the surface of the optical pattern,
wherein the optical pattern has the first pattern extending in one direction and the plurality of second patterns formed on the first pattern, and
wherein the first pattern comprises the base portion and the pattern portion protruding convexly from the base portion.

14. An optical sheet comprising:
an adhesive layer;
an optical pattern in contact with a first surface of the adhesive layer; and
a release film in contact with a second surface of the adhesive layer, opposite to the first surface,
wherein the optical pattern comprises a first pattern extending in a first direction, and a plurality of second patterns on a surface of the first pattern,
wherein the first pattern comprises peak portions having a largest thickness and first depressed portions having a smallest thickness, and
the adhesive layer comprises a third pattern of recesses respectively aligned with the first depressed portions, and a fourth pattern of recesses respectively aligned with the plurality of second patterns.

15. The optical sheet of claim 14, wherein the first pattern is a lenticular pattern having a first pitch, and a second pitch of the second pattern is equal to or larger than half the first pitch.

16. The optical sheet of claim 15, wherein the first pitch is from 20 μm to 200 μm.

17. The optical sheet of claim 15, wherein a height of the second pattern is equal to or less than 10 μm.

* * * * *